(12) United States Patent
Bushnell

(10) Patent No.: US 8,744,738 B2
(45) Date of Patent: Jun. 3, 2014

(54) AIRCRAFT TRAFFIC SEPARATION SYSTEM

(75) Inventor: Glenn Scott Bushnell, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 8 days.

(21) Appl. No.: 13/196,678

(22) Filed: Aug. 2, 2011

(65) Prior Publication Data
US 2012/0209457 A1    Aug. 16, 2012

Related U.S. Application Data

(63) Continuation-in-part of application No. 11/864,335, filed on Sep. 28, 2007.

(51) Int. Cl.
| | | |
|---|---|---|
| G06F 19/00 | (2011.01) | |
| G06G 7/70 | (2006.01) | |
| G06G 7/76 | (2006.01) | |

(52) U.S. Cl.
USPC ...... 701/122; 701/3; 701/4; 701/14; 701/120; 701/466; 340/961; 342/29; 342/455

(58) Field of Classification Search
USPC ......... 701/3, 14, 17, 120–122, 466, 527, 528, 701/301, 302; 340/951, 961; 342/29, 342/34–36, 455
See application file for complete search history.

(56) References Cited

U.S. PATENT DOCUMENTS

| | | | |
|---|---|---|---|
| 2,560,265 A | * | 7/1951 | Adler, Jr. ............... 342/455 |
| 3,668,403 A | * | 6/1972 | Meilander ............... 701/121 |
| 3,843,982 A | | 10/1974 | Lane et al. |
| 4,402,479 A | | 9/1983 | Phipps, III et al. |
| 4,839,658 A | | 6/1989 | Kathol et al. |
| 5,058,024 A | | 10/1991 | Inselberg |
| 5,381,140 A | | 1/1995 | Kuroda et al. |
| 5,566,074 A | | 10/1996 | Hammer |
| 5,627,546 A | | 5/1997 | Crow |

(Continued)

FOREIGN PATENT DOCUMENTS

| | | |
|---|---|---|
| FR | 2810146 A1 | 12/2001 |
| FR | 2898686 A1 | 9/2007 |

(Continued)

OTHER PUBLICATIONS

Chen, "Sense and Avoid (SAA) Technologies for Unmanned Aircraft (UA)", National Cheng Kung University, Dec. 4, 2008, pp. 1-38 http://ord.ncku.edu.tw/ezfiles/3/1003/irng/467/20081204_ppt.pdf.

(Continued)

*Primary Examiner* — Rami Khatib
(74) *Attorney, Agent, or Firm* — Yee & Associates, P.C.

(57) ABSTRACT

A method and apparatus for managing separation between vehicles. A closest point of approach between a first vehicle traveling along a first path and a second vehicle traveling along a second path is predicted. A number of compensation commands for altering the first path of the first vehicle are generated using the closest point of approach and a desired level of separation between the first vehicle and the second vehicle. The number of compensation commands is integrated with a number of control commands for the first vehicle to form a final number of control commands configured to maneuver the first vehicle to substantially maintain the desired level of separation between the first vehicle and the second vehicle. A response of the first vehicle to the final number of control commands is a desired response.

20 Claims, 17 Drawing Sheets

(56) References Cited

U.S. PATENT DOCUMENTS

| | | | |
|---|---|---|---|
| 6,085,147 | A | 7/2000 | Myers |
| 6,393,358 | B1 | 5/2002 | Erzberger et al. |
| 6,493,609 | B2 | 12/2002 | Johnson |
| 6,552,669 | B2 | 4/2003 | Simon et al. |
| 6,646,588 | B2 | 11/2003 | Tran |
| 6,675,095 | B1 | 1/2004 | Bird et al. |
| 6,681,158 | B2 | 1/2004 | Griffith et al. |
| 6,795,772 | B2 | 9/2004 | Lin et al. |
| 6,799,094 | B1 | 9/2004 | Vaida et al. |
| 6,873,903 | B2 | 3/2005 | Baiada et al. |
| 6,885,313 | B2 | 4/2005 | Selk et al. |
| 6,950,037 | B1 | 9/2005 | Clavier et al. |
| RE39,053 | E | 4/2006 | Rees |
| 7,024,309 | B2 * | 4/2006 | Doane .......................... 701/301 |
| 7,136,016 | B1 | 11/2006 | Swensen et al. |
| 7,194,353 | B1 | 3/2007 | Baldwin et al. |
| 7,212,917 | B2 | 5/2007 | Wilson, Jr |
| 7,306,187 | B2 | 12/2007 | Lavan |
| 7,492,307 | B2 * | 2/2009 | Coulmeau ...................... 342/32 |
| 7,516,014 | B2 * | 4/2009 | Hammarlund et al. ........ 701/301 |
| 7,630,829 | B2 * | 12/2009 | Pepitone ...................... 701/120 |
| 7,706,979 | B1 * | 4/2010 | Herwitz ....................... 701/301 |
| 8,380,424 | B2 | 2/2013 | Bushnell |
| 2002/0080059 | A1 | 6/2002 | Tran |
| 2002/0133294 | A1 | 9/2002 | Farmakis et al. |
| 2002/0152029 | A1 * | 10/2002 | Sainthuile et al. ............ 701/301 |
| 2003/0122701 | A1 * | 7/2003 | Tran ................................. 342/29 |
| 2003/0193409 | A1 | 10/2003 | Crank |
| 2004/0078136 | A1 | 4/2004 | Cornell et al. |
| 2004/0193362 | A1 | 9/2004 | Baiada et al. |
| 2005/0156777 | A1 | 7/2005 | King et al. |
| 2006/0224318 | A1 | 10/2006 | Wilson, Jr. et al. |
| 2007/0150127 | A1 | 6/2007 | Wilson, Jr. et al. |
| 2009/0088972 | A1 | 4/2009 | Bushnell |
| 2009/0125221 | A1 | 5/2009 | Estkowski et al. |
| 2010/0121574 | A1 * | 5/2010 | Ariyur et al. .................. 701/301 |
| 2014/0019034 | A1 | 1/2014 | Bushnell |

FOREIGN PATENT DOCUMENTS

| | | |
|---|---|---|
| JP | 10285099 A | 10/1998 |
| RU | 2176852 C2 | 12/2001 |
| WO | WO0041153 A1 | 7/2000 |
| WO | WO2009045664 A1 | 7/2000 |
| WO | WO0065373 A2 | 11/2000 |

OTHER PUBLICATIONS

Shakernia et al., "Sense and Avoid (SAA) Flight Test and Lessons Learned", AIAA 2006 Conference and Exhibit May 2007, Rohnert Park, California, pp. 1-15.

Suwal et al., "SeFAR Integration Test Bed for See and Avoid Technologies",AIAA 2005-7178, Infotech@Aerospace, Sep. 2005, Arlington, Virginia, pp. 1-7.

Blackman, "Multiple-Target Tracking with Radar Applications", Artech House Radar Library, 1986, pp. 42-43.

Smith, "Sequential Estimation of Observation Error Variances in a Trajectory Estimation Problem", AIAA Journal, vol. 5, No. 11, Nov. 1967, pp. 1964-1970.

Myers et al., "Adaptive Sequential Estimation with Unknown Noise Statistics", IEEEE Transactions on Automatic Control, Aug. 1976, pp. 520-523.

Nordsjo, "Target Tracking Based on Kalman-type Filters Combined with Recursive Estimation of Model Disturbances", 2005, IEEE, pp. 1-6.

Mejia et al, "Safe Trajectory Tracking for the Two-Aircraft System," 2007 IEEE International Conference on Electro/Information Technology, May 2007, pp. 362-367.

Office Action, dated Jun. 21, 2013, regarding USPTO U.S. Appl. No. 13/739,741, 15 pages.

Notice of Allowance, dated Oct. 11, 2013, regarding USPTO U.S. Appl. No. 13/739,741, 7 pages.

EP Search Report, dated Dec. 3, 2013, regarding Application No. EP12178454, 8 pages.

PCT Intl Search Report and Written Opinion for Application No. PCT/US2008/074413, dated May 8, 2009, 14 pgs.

Chang et ai, "Collision Avoidance for Multiple Agent Systems", 42nd IEEE Conf on Decision and Control, Dec. 2003, vol. 1, pp. 539-543.

Hill et al., "A Multi-Agent System Architecture for Distributed Air Traffic Control", AIAA Guidance, Navigation and Control Conf, Aug. 2005, 11 pgs.

Livadas et al., "High-Level Modeling and Analysis of the Traffic Alert and Collision Avoidance System (TCAS)", Proceedings of the IEEE, vol. 88, No. 7, Jul. 2000, pp. 926-948.

Mejia et al, "Safe Trajectory Tracking for the Two-Aircraft System", 2007 IEEE Inti Conf on Electro/Information Technology, May 2007, pp. 362-367 (abstract only).

Schouwenaars et al., "Decentralized Cooperative Trajectory Planning of Multiple Aircraft with Hard Safety Guarantees", AIAA Guidance, Navigation and Control Conf, Aug. 2004, 14 pgs.

Stipanovic et al., "Cooperative Avoidance Control for Multiagent Systems", submitted as an invited paper for the ASME Journal of Dynamic Systems, Measurements and Control special issue on Multi-Agent Systems 2006, vol. 129, Sep. 2007, pp. 699-707.

Non-final office action dated Jan. 28, 2011 regarding application 11/864,335, 16 pages.

Non-final office action dated Aug. 13, 2010 regarding U.S. Appl. No. 11/864,335, 24 pages.

Notice of allowance dated Oct. 16, 2012 regarding U.S. Appl. No. 11/864,335, 5 pages.

Bushnell, "Vehicle-Based Automatic Traffic Conflict and Collision Avoidance," U.S. Appl. No. 13/739,741, filed Jan. 11, 2013, 48 pages.

* cited by examiner

AIRCRAFT TRAFFIC SEPARATION SYSTEM

CROSS-REFERENCE TO RELATED APPLICATION

This application is a continuation-in-part of patent application U.S. Ser. No. 11/864,335, filed Sep. 28, 2007, entitled "Vehicle-Based Automatic Traffic Conflict and Collision Avoidance", which is incorporated herein by reference.

BACKGROUND INFORMATION

1. Field

The present disclosure relates generally to aircraft and, in particular, to managing movement of aircraft. Still more particularly, the present disclosure relates to a method and apparatus for maintaining a desired level of separation between aircraft.

2. Background

Air traffic control (ATC) is a service used to direct aircraft on the ground and in the air. This service may be used in controlling aircraft, such as, for example, unmanned aerial vehicles (UAVs), helicopters, and/or other suitable types of aircraft. Currently, air traffic control is provided by ground-based air traffic control systems and human air traffic controllers. Typically, these ground-based air traffic control systems and human air traffic controllers provide information to pilots and/or other operators of aircraft that may be used to expedite the flow of air traffic on the ground and in the air. Further, the pilots and/or other operators of the aircraft may use this information as well as their own situational awareness to maintain separation between the aircraft on the ground and in the air.

Various rules and regulations may govern a desired level of separation between an aircraft and other aircraft. In some cases, this separation may be defined as a minimum distance from the aircraft in any number of directions. For example, this separation may be defined as a minimum distance from the aircraft with respect to the lateral, vertical, and/or longitudinal directions.

Air traffic control may be labor intensive and costly. For example, air traffic control systems may require more processing resources, personnel, and/or other resources than desired. Further, even though an air traffic control system may provide instructions to an aircraft to maintain a desired level of separation from other aircraft, the pilot of the aircraft is still responsible for operating the aircraft to actually maintain this level of separation.

Additionally, factors such as, for example, weather conditions, visibility conditions, reduced situational awareness, fatigue, stress, level of experience, and/or other suitable factors may affect the ability of the pilot of the aircraft to make decisions and perform aircraft maneuvers to maintain the desired level of separation between the aircraft and other aircraft. These same factors may also affect the ability of human air traffic controllers to provide the most accurate information and/or instructions to the pilot of the aircraft.

Therefore, it would be advantageous to have a method and apparatus that takes into account at least some of the issues discussed above, as well as possibly other issues.

SUMMARY

In one advantageous embodiment, a method for managing separation between vehicles is provided. A closest point of approach between a first vehicle traveling along a first path and a second vehicle traveling along a second path is predicted. A number of compensation commands for altering the first path of the first vehicle are generated using the closest point of approach and a desired level of separation between the first vehicle and the second vehicle. The number of compensation commands is integrated with a number of control commands for the first vehicle to form a final number of control commands configured to maneuver the first vehicle to substantially maintain the desired level of separation between the first vehicle and the second vehicle. A response of the first vehicle to the final number of control commands is a desired response.

In another advantageous embodiment, a system comprises a separation management module. The separation management module is configured to predict a closest point of approach between a first vehicle traveling along a first path and a second vehicle traveling along a second path using the first path and the second path. The separation management module is further configured to generate a number of compensation commands for altering the first path of the first vehicle using the closest point of approach and a desired level of separation between the first vehicle and the second vehicle. The separation management module is further configured to integrate the number of compensation commands with a number of control commands for the first vehicle to form a final number of control commands configured to maneuver the first vehicle to substantially maintain the desired level of separation between the first vehicle and the second vehicle. A response of the first vehicle to the final number of control commands is a desired response.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
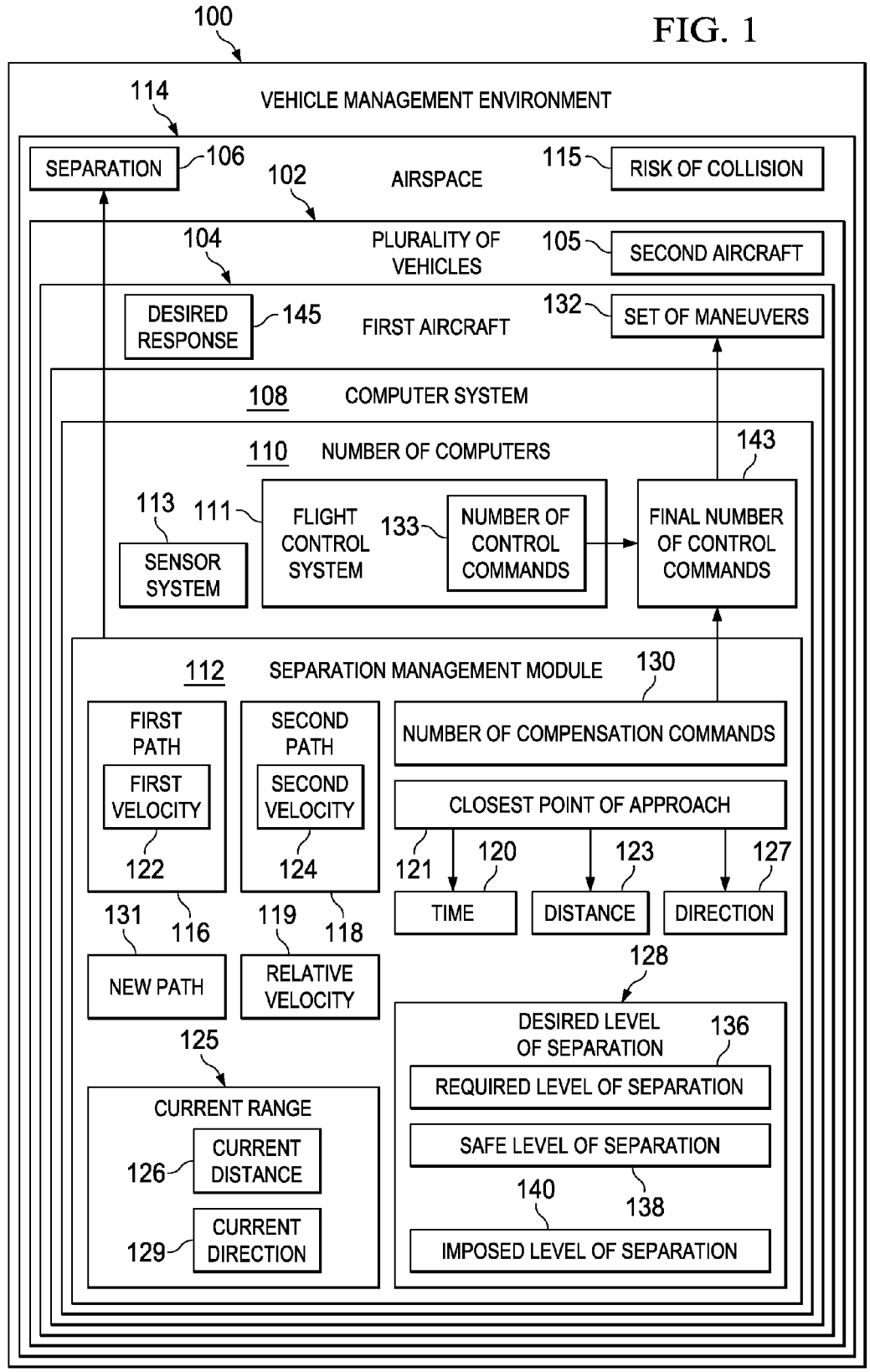
FIG. 1 is an illustration of a vehicle management environment in the form of a block diagram in accordance with an advantageous embodiment.

The different advantageous embodiments recognize and take into account one or more different considerations. For example, the different advantageous embodiments recognize and take into account that avoidance systems currently in use on aircraft provide a backup to the observations and directions provided by an air traffic control system.

The different advantageous embodiments recognize and take into account that currently available avoidance systems may provide warnings to aircraft when two or more aircraft are flying too close to each other. Further, these avoidance systems may also provide one or more of the aircraft with a suggested maneuver that may reduce a risk of collision. However, the different advantageous embodiments recognize and take into account that it may be desirable to have an avoidance system on an aircraft that can control the aircraft to reduce a risk of collision between the aircraft and other aircraft.

Further, the different advantageous embodiments recognize and take into account that having an avoidance system that can control the aircraft to reduce the risk of collision without requiring input from an operator of the aircraft may be desirable. For example, the different advantageous embodiments recognize and take into account that it may be desirable to have an avoidance system that is capable of altering the flight path of the aircraft and/or causing the aircraft to perform maneuvers to reduce a risk of collision between the aircraft and other aircraft without requiring operator input. With this type of avoidance system, the different advantageous embodiments recognize and take into account that the possibility of human error and/or the risk of an operator performing a maneuver that will increase the risk of collision may be reduced.

Additionally, the different advantageous embodiments recognize and take into account that using an avoidance system on an aircraft that can control the aircraft to reduce a risk of collision without requiring operator input may reduce the workload of human air traffic controller and air traffic control systems. As a result, these human air traffic controllers and air traffic control systems may be able to manage the flights of an increased number of aircraft.

Further, the different advantageous embodiments recognize and take into account that an avoidance system that can control an aircraft to reduce a risk of collision between the aircraft and other aircraft without requiring operator input may be used in unmanned aerial vehicles (UAVs). As a result, fewer processing resources and/or personnel may be needed to monitor the flight of unmanned aerial vehicles performing commercial and/or military operations.

Thus, the different advantageous embodiments provide a method and apparatus for managing separation between vehicles. In one advantageous embodiment, a method for managing separation between vehicles is provided. A closest point of approach between a first vehicle traveling along a first path and a second vehicle traveling along a second path is predicted. A number of compensation commands for altering the first path of the first vehicle are generated using the closest point of approach and a desired level of separation between the first vehicle and the second vehicle. The number of compensation commands is integrated with a number of control commands for the first vehicle to form a final number of control commands configured to maneuver the first vehicle to substantially maintain the desired level of separation between the first vehicle and the second vehicle. A response of the first vehicle to the final number of control commands is a desired response.

With reference now to the figures, and in particular to FIG. 1, an illustration of a vehicle management environment in the form of a block diagram is depicted in accordance with an advantageous embodiment. In these illustrative examples, vehicle management environment 100 includes plurality of vehicles 102. A vehicle in plurality of vehicles 102 may be selected from one of an aircraft, an unmanned aerial vehicle, a helicopter, a submarine, a surface ship, a missile, a spacecraft, a ground vehicle, or some other suitable type of vehicle.

As one illustrative example, a first vehicle in plurality of vehicles 102 may be first aircraft 104 and a second vehicle in plurality of vehicles 102 may be second aircraft 105. Separation 106 between first aircraft 104 and second aircraft 105 while at least one of these vehicles is operating may be managed using separation management module 112. Separation management module 112 may be implemented using hardware, software, or a combination of both.

In these illustrative examples, separation management module 112 may be implemented in computer system 108. Computer system 108 takes the form of number of computers 110 in these examples. As used herein, a number of items means one or more items. For example, a number of computers means one or more computers. Depending on the implementation, number of computers 110 may be located in at least one of first aircraft 104, second aircraft 105, another vehicle in plurality of vehicles 102, a ground station, an air traffic control station, or some other suitable location.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In these depicted examples, computer system 108 with separation management module 112 is located on first aircraft 104. In particular, separation management module 112 is configured to provide separation 106 between first aircraft 104 and other vehicles within plurality of vehicles 102 when first aircraft 104 is on the ground and/or in the air.

In these illustrative examples, first aircraft 104 and second aircraft 105 are traveling in airspace 114. Separation management module 112 is configured to provide separation 106 between first aircraft 104 and second aircraft 105 to reduce risk of collision 115 between first aircraft 104 and second aircraft 105 in airspace 114. Further, separation management module 112 may be configured to provide separation 106 between first aircraft 104 and other vehicles within plurality of vehicles 102.

As depicted, separation management module 112 identifies first path 116 for first aircraft 104 and second path 118 for second aircraft 105. First path 116 may be a first flight path for first aircraft 104. Second path 118 may be a second flight path for second aircraft 105. In these illustrative examples, the information used in identifying a path for a vehicle may include at least one of a velocity, a speed, a heading, a direction of travel, a position, an orientation, an attitude, a route, a course, a turn rate, a climb rate, and other suitable information for the vehicle. A velocity is a measurement of a rate and direction of change of a position for a vehicle. In this manner, velocity includes both magnitude and direction for the change in the position of the vehicle. The magnitude of the velocity is the speed of the vehicle.

In these illustrative examples, separation management module 112 may identify first path 116 for first aircraft 104 using information obtained from a number of sources. These sources may include, for example, at least one of flight control system 111 onboard first aircraft 104, sensor system 113 onboard first aircraft 104, an air traffic control system, and other suitable sources of information.

Flight control system 111 may include at least one of an autopilot system, a flight management system, a flight director, a navigation system, and a number of suitable systems used to control operation of first aircraft 104. In one illustrative example, separation management module 112 may identify first path 116 using predetermined flight paths stored in a navigation system in flight control system 111.

Further, sensor system 113 onboard first aircraft 104 comprises a number of sensors. These sensors may include at least one of, for example, without limitation, a global positioning system unit, an inertial measurement unit, a camera system, a radar system, a surveillance system, a laser range meter, a position identification system, an altimeter, and other suitable types of sensors. In some illustrative examples, separation management module 112 may identify first path 116 of first aircraft 104 using sensor data generated by sensor system 113.

Further, separation management module 112 also may identify second path 118 for second aircraft 105 using information obtained from a number of different sources. These sources may include, for example, without limitation, at least one of a flight management system onboard second aircraft 105, a sensor system onboard second aircraft 105, sensor system 113 onboard first aircraft 104, an air traffic control system, and other suitable sources of information.

In one illustrative example, second path 118 for second aircraft 105 may be identified using predetermined flight paths for second aircraft 105 received from second aircraft 105 and/or an air traffic control system. In another illustrative example, second path 118 may be identified using sensor data generated by sensor system 113 onboard first aircraft 104.

As depicted in this example, first path 116 includes first velocity 122 for first aircraft 104. Second path 118 includes second velocity 124 for second aircraft 105. In some illustrative examples, separation management module 112 may also be configured to identify relative velocity 119. Relative velocity 119 may be the velocity of second aircraft 105 with respect to first aircraft 104 or the velocity of first aircraft 104 with respect to second aircraft 105, depending on the implementation.

Separation management module 112 predicts closest point of approach (CPA) 121 between first aircraft 104 and second aircraft 105 using first path 116 for first aircraft 104 and second path 118 for second aircraft 105. In these illustrative examples, closest point of approach 121 between first aircraft 104 traveling on first path 116 and second aircraft 105 traveling on second path 118 is predicted to occur when distance 123 between first aircraft 104 and second aircraft 105 has a minimum value if first aircraft 104 continues traveling along first path 116 and second aircraft 105 continues traveling along second path 118.

In other words, in predicting closest point of approach 121, separation management module 112 predicts distance 123 between first aircraft 104 and second aircraft 105 that is expected to be smallest if first aircraft 104 continues traveling along first path 116 and second aircraft 105 continues traveling along second path 118. Distance 123 between first aircraft 104 and second aircraft 105 predicted at closest point of approach 121 may also be referred to as a miss distance.

Further, in predicting closest point of approach 121, separation management module 112 also predicts direction 127 of second aircraft 105 with respect to first aircraft 104. Direction 127 is the direction of second aircraft 105 with respect to first aircraft 104 when distance 123 between first aircraft 104 and second aircraft 105 is predicted to have the minimum value.

In these illustrative examples, distance 123 and direction 127 at closest point of approach 121 define a range between first aircraft 104 and second aircraft 105 at closest point of approach 121. This range is the smallest range that is predicted to occur between these two aircraft as the two aircraft travel along their respective paths. Further, this range may be represented as a vector having a magnitude that is distance 123 at closest point of approach 121 and a direction that is direction 127 at closest point of approach 121. In this manner, closest point of approach 121 may be represented as a vector.

Additionally, separation management module 112 also predicts time 120 to closest point of approach 121 using first path 116 for first aircraft 104 and second path 118 for second aircraft 105. Time 120 to closest point of approach 121 is the period of time from a current time to a time at which closest point of approach 121 occurs. In other words, time 120 is the period of time from the current time to a time at which distance 123 between first aircraft 104 and second aircraft 105 has the minimum value. In these illustrative examples, time 120 to closest point of approach 121 may also be referred to as a time-to-go to closest point of approach 121.

In some illustrative examples, distance 123 at closest point of approach 121 may be predicted using time 120 to closest point of approach 121 that has been predicted. In other illustrative examples, time 120 to closest point of approach may be predicted using distance 123 between first aircraft 104 and second aircraft 105 that has been predicted.

In these illustrative examples, current range 125 also is used in predicting closest point of approach 121 between first aircraft 104 and second aircraft 105. Current range 125 includes current distance 126 between first aircraft 104 and second aircraft 105 and current direction 129 of second aircraft 105 with respect to first aircraft 104.

In one illustrative example, current range 125 may be identified using a current position of first aircraft 104 and a current position of second aircraft 105. In some illustrative examples, current range 125 may be identified without requiring an identification of the positions of second aircraft 105 and first aircraft 104. For example, current range 125 may be identified using a radar system, a laser range meter, and/or some other suitable types of range identification system.

Desired level of separation 128 may currently be present between first aircraft 104 and second aircraft 105 based on current range 125 between first aircraft 104 and second aircraft 105. However, as first aircraft 104 and second aircraft 105 travel along first path 116 and second path 118, respectively, desired level of separation 128 between first aircraft 104 and second aircraft 105 may be lost. This loss of desired level of separation 128 may be referred to as a loss of separation between first aircraft 104 and second aircraft 105.

In these depicted examples, separation management module 112 makes a determination as to whether first aircraft 104 and second aircraft 105 are predicted to have desired level of separation 128 between first aircraft 104 and second aircraft 106 at closest point of approach 121. In other words, separation management module 112 determines whether distance 123 between first aircraft 104 and second aircraft 105 predicted at closest point of approach 121 provides desired level of separation 128.

Desired level of separation 128 is selected to reduce and/or eliminate risk of collision 115 between first aircraft 104 and second aircraft 105. In other words, desired level of separation 128 may be selected such that a possibility of a collision between first aircraft 104 and second aircraft 105 may be reduced and/or avoided. A determination that distance 123 predicted at closest point of approach 121 does not provide desired level of separation 128 indicates that at some point during the flights of first aircraft 104 and second aircraft 105, a loss of separation may occur. Separation management module 112 may control first aircraft 104 such that desired level of separation 128 is maintained and the loss of separation is prevented from occurring.

For example, separation management module 112 may be configured to generate number of compensation commands 130 for first aircraft 104. In these illustrative examples, number of compensation commands 130 may also be referred to as a number of avoidance commands.

Number of compensation commands 130 may be configured to cause first aircraft 104 to alter first path 116. For example, number of compensation commands 130 may be configured to alter first path 116 for first aircraft 104 to increase distance 123 between first aircraft 104 and second aircraft 105 predicted at closest point of approach 121. Increasing distance 123 between first aircraft 104 and second aircraft 105 predicted at closest point of approach 121 may provide desired level of separation 128 at closest point of approach 121.

For example, number of compensation commands 130 may cause first aircraft 104 to perform set of maneuvers 132 to maintain desired level of separation 128 between first aircraft 104 and second aircraft 105. As used herein, a set of items means zero or more items. For example, a set of maneuvers means zero, one, or more maneuvers. Further, a set may be an empty or null set.

A maneuver in set of maneuvers 132 may be selected from at least one of a turning maneuver, a climbing maneuver, a descending maneuver, a banking maneuver, an acceleration maneuver, a deceleration maneuver, and other suitable types of maneuvers. In these illustrative examples, set of maneuvers 132 may be an empty set when desired level of separation 128 is present based on closest point of approach 121 predicted between first aircraft 104 and second aircraft 105.

In these illustrative examples, number of compensation commands 130 is integrated with number of control commands 133 generated by flight control system 111 to control operation of first aircraft 104. Number of control commands 133 includes the commands that control the flight of first aircraft 104 in airspace 114.

For example, number of control commands 133 may include at least one of a climb acceleration command, a turn rate command, a climb rate command, an altitude command, a pitch command, a yaw command, a roll command, an acceleration command, a deceleration command, a lateral acceleration command, and other suitable commands. In this manner, number of control commands 133 is configured to maneuver first aircraft 104 in airspace 114.

Number of compensation commands 130 may be integrated with number of control commands 133 to adjust number of control commands 133 such that first aircraft 104 performs set of maneuvers 132. For example, separation management module 112 may generate number of compensation commands 130 that may be integrated with number of control commands 133 to alter first path 116 for first aircraft 104 to new path 131. New path 131 may also be referred to as an altered flight path. New path 131 may include at least one of a new velocity, a new speed, a new heading, and a new direction of travel for first aircraft 104.

In these illustrative examples, integration of number of compensation commands 130 with number of control commands 133 may form final number of control commands 143 that are used to maneuver first vehicle 105 to substantially maintain desired level of separation 128 between first aircraft 104 and second aircraft 105. In particular, this integration may be performed in a manner such that a response of first aircraft 104 to final number of control commands 143 is desired response 145. More specifically, final number of control commands 143 is configured to produce desired response 145 by first aircraft 104.

In other words, number of compensation commands 130 is integrated with number of control commands 133 such that first aircraft 104 performs set of maneuvers 132 in a desired manner. In this manner, desired response 145 may also be referred to as a desired maneuvering response for first aircraft 104.

Desired response 145 may comprise at least one of, for example, without limitation, a desired ride quality for the flight of first aircraft 104, a desired level of passenger comfort during the flight, a desired range of acceleration, a desired response time, a desired turning rate, and other suitable factors in the response of first aircraft 104. The desired response time may be, for example, how quickly first aircraft 104 is desired to respond to final number of control commands 143. In some cases, the desired response time may be how quickly first aircraft 104 is desired to initiate set of maneuvers 132 once final number of control commands 143 have been issued.

Further, in some cases, desired response 145 of aircraft may also include a desired time within which flight path 116 of flight aircraft 104 is to be altered such that the new separation predicted between first aircraft 104 and second aircraft 105 at a new predicted closest point of approach provides desired level of separation 128. In other cases, desired response 145 may include a desired time after which first path 116 is to be reacquired after desired level of separation 128 has been provided at the predicted closest point of approach.

In these illustrative examples, separation management module 112 is configured to monitor separation 106 between first aircraft 104 and other vehicles in plurality of vehicles 102 continuously. In other illustrative examples, separation 106 may be monitored periodically. For example, separation management module 112 may be configured to monitor separation 106 between first aircraft 104 and second aircraft 105 every tenth of a second, every second, every several seconds, or based on some other suitable period of time.

In one illustrative example, separation management module 112 may perform the operations of identifying second path 118 for second aircraft 105, predicting closest point of approach 121, and determining whether desired level of separation 128 is present at closest point of approach 121 about every tenth of a second. In other illustrative examples, these operations may be initiated, disabled, and/or influenced by a human operator for first aircraft 104.

As depicted, desired level of separation 128 may be selected from one of required level of separation 136, safe level of separation 138, and imposed level of separation 140. Required level of separation 136 may be based on requirements and/or regulations provided by, for example, without limitation, an air traffic control system.

Additionally, required level of separation 136 may be based on factors in addition to, and/or in place of, the requirements and/or regulations provided by the air traffic control system. These factors may include, for example, without limitation, aircraft type and/or aircraft class, operating parameters, size, a current phase of flight, planned phases of flight, altitude, and/or other suitable factors related to first aircraft 104 and/or second aircraft 105.

In these illustrative examples, the parameters used to define required level of separation 136 may remain substantially constant for a flight of first aircraft 104. In other illustrative examples, the parameters used to define required level of separation 136 may change during the flight of first aircraft 104. For example, required level of separation 136 may change during the flight of first aircraft 104 in response to changes in weather conditions, visibility conditions, changes in environmental conditions, a change to a mission for first aircraft 104, different portions of airspace 114, and/or other types of events.

Safe level of separation 138 is a higher level of separation than required level of separation 136. Safe level of separation 138 includes required level of separation 136 and an additional amount of separation. This additional amount of separation may take into account any uncertainty or error with respect to the prediction of closest point of approach 121. In particular, safe level of separation 138 takes into account any uncertainty that may be present in the prediction of distance 123 at closest point of approach 121.

Further, imposed level of separation 140 is a higher level of separation than safe level of separation 138. Imposed level of separation 140 incudes safe level of separation 138 and an additional amount of separation. This additional amount of separation may take into account any predictable error in the response of first aircraft 104 to an alteration in first path 116 initiated by separation management module 112.

The illustration of vehicle management environment 100 in FIG. 1 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in other illustrative examples, separation management module 112 may be configured to manage separation 106 between first aircraft 104 and additional vehicles in addition to, and/or in place of, second aircraft 105 in plurality of vehicles 102. Further, in some illustrative examples, first aircraft 104 may be stationary or moving on the ground, while second aircraft 105 is flying in airspace 114.

In still other illustrative examples, desired level of separation 128 may be defined with respect to second aircraft 105 instead of first aircraft 104. For example, desired level of separation 128 may be defined as a distance from second aircraft 105 that first aircraft 104 should maintain while traveling in airspace 114. Additionally, in other illustrative examples, time 120 may be an actual time at which closest point of approach 121 may occur rather than the period of time until closest point of approach 121 occurs with respect to the current time.

Figure 2:
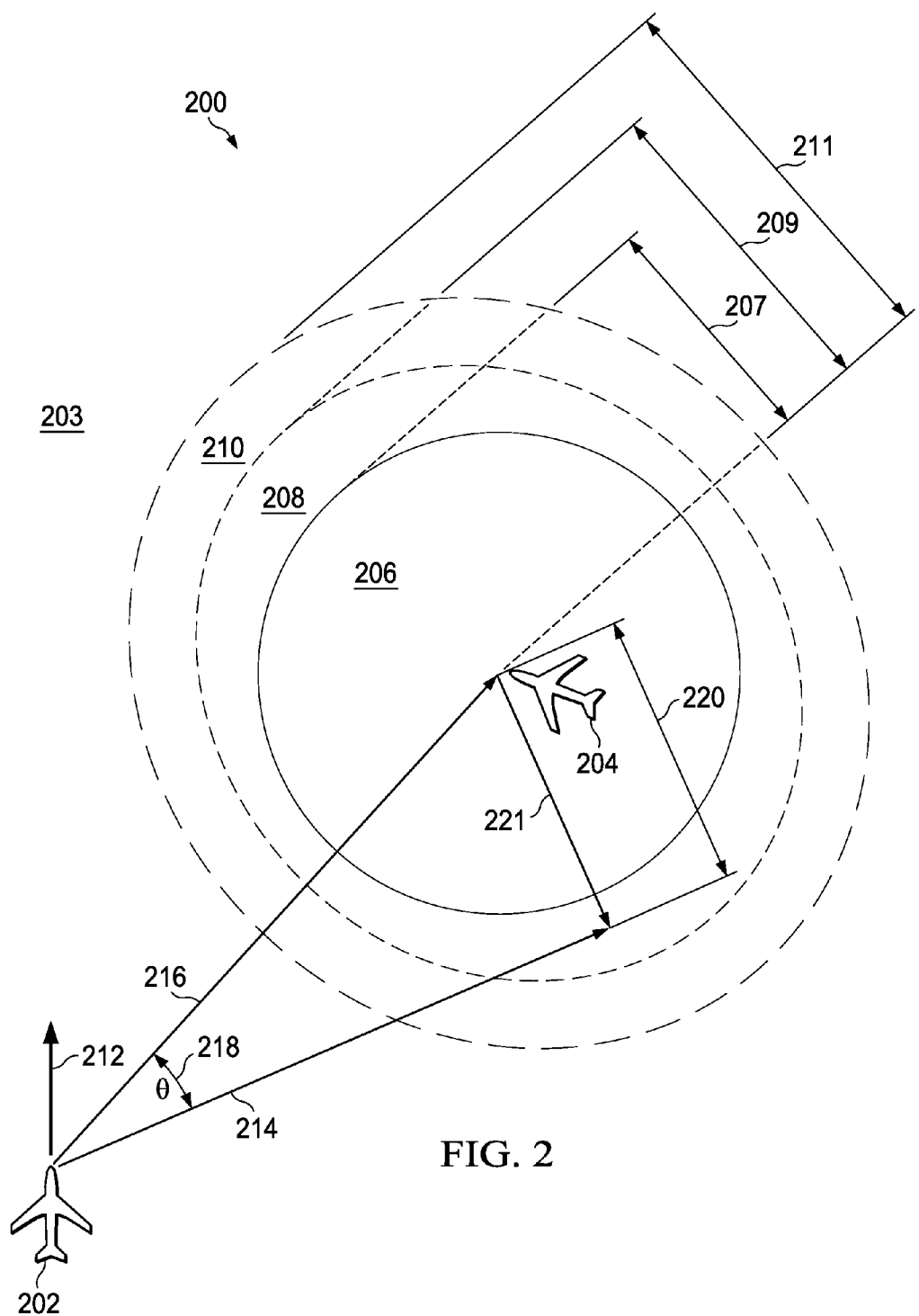
FIG. 2 is an illustration of boundaries for desired levels of separation in accordance with an advantageous embodiment.

With reference now to FIG. 2, an illustration of boundaries for desired levels of separation is depicted in accordance with an advantageous embodiment. In this illustrative example, boundaries 200 define different levels of separation that may be desired between first aircraft 202 and other aircraft traveling in airspace 203.

First aircraft 202 and second aircraft 204 are examples of implementations for first aircraft 104 and second aircraft 105, respectively, in FIG. 1. In this illustrative example, separation management module 112 from FIG. 1 may be configured to manage separation between first aircraft 202 and second aircraft 204 while first aircraft 202 and second aircraft 204 are traveling in airspace 203.

As depicted, boundaries 200 for first aircraft 202 are defined with respect to second aircraft 204. For example, boundaries 200 include boundary 206, boundary 208, and boundary 210. These boundaries define the portion of airspace 203 with respect to second aircraft 204 in which both first aircraft 202 and second aircraft 204 should not simultaneously be present.

For example, boundary 206 provides a required level of separation between first aircraft 202 and second aircraft 204. This level of separation is an example of required level of separation 136 in FIG. 1. Boundary 206 is at distance 207 from second aircraft 204. Distance 207 is a required distance, $m_{required}$, for separation between second aircraft 204 and first aircraft 202. In other words, distance 207 is the minimum distance from second aircraft 204 that should be maintained by first aircraft 202 to provide the required level of separation between first aircraft 202 and second aircraft 204.

In these illustrative examples, distance 207 may be selected by, for example, a pilot of first aircraft 202, an air traffic control system, the airline to which first aircraft 202 belongs, or some other suitable authority. Distance 207 may be selected based on factors such as, for example, safety regulations, a size of first aircraft 202, operating parameters for first aircraft 202, maneuvering capabilities of first aircraft 202, a type of mission being performed by first aircraft 202, and/or other suitable factors.

Boundary 208 provides a safe level of separation between first aircraft 202 and second aircraft 204. This level of separation is an example of safe level of separation 138 in FIG. 1. Boundary 206 is at distance 209 from second aircraft 204. Distance 209 is a safe distance, $m_{safe}$, for separation between second aircraft 204 and first aircraft 202. In other words, distance 209 is the distance from second aircraft 204 that should be maintained by first aircraft 202 to provide the safe level of separation between first aircraft 202 and second aircraft 204.

In these illustrative examples, distance 209 may be computed by separation management module 112 from FIG. 1 using distance 207. For example, distance 209 may be computed as the sum of the required distance and the product of an estimated uncertainty and a gain. In other words, distance 209 may be computed using the following equation:

$$m_{safe} = m_{required} + k_m \sigma_m, \quad (1)$$

where $k_m$ is the gain, and $\sigma_m$ is the estimated uncertainty.

The estimated uncertainty is an estimate of the uncertainty in the prediction of the closest point of approach between first aircraft 202 and second aircraft 204. In particular, the estimated uncertainty is an estimate of the uncertainty in distance 220 predicted between first aircraft 202 and second aircraft 204 at the closest point of approach predicted between first aircraft 202 and second aircraft 204. Distance 220 is also referred to as the miss distance, m, at the closest point of approach between first aircraft 202 and second aircraft 204.

In these illustrative examples, the uncertainty may be based on deviations that occur during the flights of first aircraft 202 and second aircraft 204. These deviations may include, for example, deviations in the range between first aircraft 202 and second aircraft 204, the heading of first aircraft 202 and/or second aircraft 204, the relative velocity of second aircraft 204 with respect to first aircraft 202, and/or other parameters. These deviations may occur in response to, for example, without limitation, weather conditions, wind conditions, sensor noise, tracking errors, and/or other suitable factors.

Further, this uncertainty may be based on estimated errors in the identification of the flight path for first aircraft 202 and the flight path for second aircraft 204. These errors may include, for example, the errors estimated for the identification of the velocities and positions of first aircraft 202 and/or second aircraft 204.

Boundary 210 provides an imposed level of separation between first aircraft 202 and second aircraft 204. This level of separation is an example of imposed level of separation 140 in FIG. 1. In this illustrative example, this imposed level of separation is the level of separation desired between first aircraft 202 and second aircraft 204. However, in other illustrative examples, the required level of separation and/or safe level of separation may be selected as the desired level of separation.

Boundary 210 is at distance 211 from second aircraft 204. Distance 211 is an imposed distance, $m_{imposed}$, for separation between second aircraft 204 and first aircraft 202. Distance 211 is the safe distance, $m_{safe}$, divided by a steady state response gain, $C_{ss}$, for the system used to identify the closest point of approach. In other words, distance 209 is:

$$m_{imposed} = (m_{required} + k_m \sigma_m)/C_{ss}. \quad (2)$$

In this illustrative example, velocity vector 212 represents the velocity of first aircraft 202. Further, relative velocity vector 214 represents the relative velocity of first aircraft 202 with respect to second aircraft 204 in this illustrative example.

As depicted, range vector 216 indicates the distance between first aircraft 202 and second aircraft 204 as well as the direction of the position of second aircraft 204 relative to the position of first aircraft 202. Angle 218 is the angle formed by relative velocity vector 214 and range vector 216.

In this illustrative example, if first aircraft 202 and second aircraft 204 continue on their respective flight paths at the same velocities, the time to the closest point of approach predicted between the two aircraft may be defined as follows:

$$t_{CPA} = R \cos(\theta)/V_{relative}, \quad (3)$$

where $t_{CPA}$ is the time to the closest point of approach, R is the magnitude of range vector 216, $\theta$ is angle 218, and $V_{relative}$ is the magnitude of relative velocity vector 214.

As depicted, vector 221 represents the closest point of approach between first aircraft 202 and second aircraft 204. The magnitude of vector 221 is distance 220. As described earlier, distance 220 is the miss distance, m, between first aircraft 202 and second aircraft 204. In other words, distance 220 is the distance of first aircraft 202 from second aircraft 204 predicted at the time to the closest point of approach.

When distance 220 is less than distance 211, the desired level of separation is not predicted to occur at the closest point of approach. The distance needed to obtain the desired level of separation at the closest point of approach may be computed as the miss distance subtracted from the imposed distance. This distance may also be referred to as the recover distance. In particular, the recover distance is the additional distance from second aircraft 204 needed to recover the desired level of separation. The recover distance may be given by the following equation:

$$d_{recover} = (m_{imposed} - m). \quad (4)$$

In these illustrative examples, commands may be generated that cause first aircraft 202 to alter its flight path such that the desired level of separation is maintained between first aircraft 202 and second aircraft 204. First aircraft 202 may alter its flight path by changing headings, climbing, descending, turning, slowing down, speeding up, or performing some other suitable operation.

Figure 3:
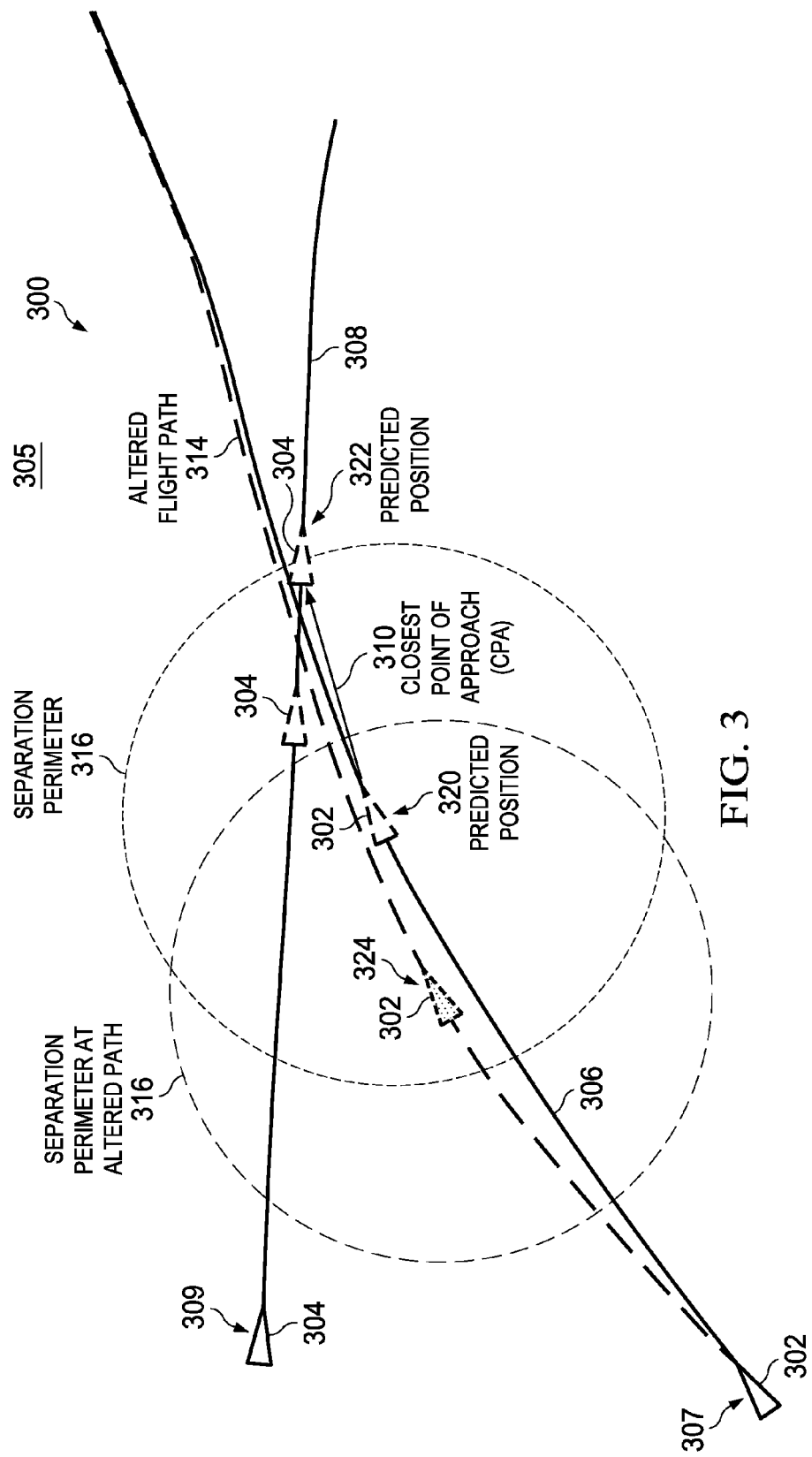
FIG. 3 is an illustration of an air traffic management environment in accordance with an advantageous embodiment.

With reference now to FIG. 3, an illustration of an air traffic management environment is depicted in accordance with an advantageous embodiment. Air traffic management environment 300 is an example of one implementation for vehicle management environment 100 in FIG. 1.

As illustrated, first aircraft 302 and second aircraft 304 are traveling in airspace 305 in air traffic management environment 300. First aircraft 302 may be an example of one implementation for first aircraft 104 in FIG. 1. Second aircraft 304 may be an example of one implementation for second aircraft 105 in FIG. 1.

First aircraft 302 may be equipped with a collision avoidance system, referred to as a vehicle-centric collision avoidance system. A vehicle-centric collision avoidance system is a system configured for the specific vehicle on which the system is located. The vehicle-centric collision avoidance system in first aircraft 302 may include a separation management module, such as separation management module 112 in FIG. 1, configured to reduce the risk of collision between first aircraft 302 and second aircraft 304. For example, the vehicle-centric collision avoidance system on first aircraft 302 may be configured to cause first aircraft 302 to perform escape maneuvers to avoid a collision with second aircraft 304 and/or other aircraft (not shown) in air traffic management environment 300.

As depicted, first aircraft 302 is traveling on flight path 306 in airspace 305, while second aircraft 304 is traveling on flight path 308 in airspace 305. In this illustrative example, first aircraft 302 is currently at position 307 along flight path 306 and second aircraft 304 is currently at position 309 along flight path 308.

The vehicle-centric collision avoidance system of first aircraft 302 may be configured to predict closest point of approach (CPA) 310 between first aircraft 302 and second aircraft 304 with respect to first aircraft 302. Closest point of approach 310 indicates the smallest range between first aircraft 302 and second aircraft 304 that is predicted to occur when first aircraft 302 and second aircraft 304 continue on flight path 306 and flight path 308, respectively.

As depicted, closest point of approach 310 is predicted to occur when first aircraft 302 is at predicted position 320 along flight path 306 and second aircraft 304 is at predicted position 322 along flight path 308. Closest point of approach 310 may be represented as a range vector having both magnitude and direction with respect to first aircraft 302. In these illustrative examples, the magnitude of the vector indicates the distance between first aircraft 302 and second aircraft 304 at closest point of approach 310. In other words, the magnitude is the distance between predicted position 320 for first aircraft 302 and predicted position 322 for second aircraft 304. As described earlier, the distance between first aircraft 302 and second aircraft 304 at closest point of approach 310 may be also referred to as the miss distance between these two aircraft at closest point of approach 310.

Further, the direction of the vector for closest point of approach 310 indicates the direction of predicted position 322 for second aircraft 304 at closest point of approach 310 with respect to predicted position 320 for first aircraft 302.

Additionally, the vehicle-centric collision avoidance system of first aircraft 302 may predict a time to closest point of approach 310. In other words, the vehicle-centric collision avoidance system of first aircraft 302 may predict the time at which closest point of approach 310 between first aircraft 302 and second aircraft 304 is predicted to occur. In some illustrative examples, the time to closest point of approach 310 may be referred to as a predicted time-to-go or predicted time duration before first aircraft 302 reaches closest point of approach 310.

In these illustrative examples, making a prediction of closest point of approach 310 may include identifying the current range between first aircraft 302 and second aircraft 304. The current range includes the current distance between first aircraft 302 in position 307 and second aircraft 304 in position 309. Further, the current range may include the direction of position 309 for second aircraft 304 with respect to position 309 for first aircraft 302.

As illustrated, separation perimeter 316 may be predefined in the vehicle-centric collision avoidance system of first aircraft 302. Separation perimeter 316 may be a boundary that defines a desired level of separation with respect to first aircraft 302. In some illustrative examples, the boundary may be at a distance from first aircraft 302 that is substantially equal in all directions. When separation perimeter 316 is three-dimensional, separation perimeter 316 may also be referred to as a separation perimeter layer. For example, separation perimeter 316 may be defined as a three-dimensional layer or surface around first aircraft 302 in the form of a sphere.

In this manner, separation perimeter 316 indicates the distance from first aircraft 302 in any number of directions that provides a desired level of separation between first aircraft 302 and other aircraft in airspace 305. The vehicle-centric collision avoidance system of first aircraft 302 is configured to maintain this desired level of separation between first aircraft 302 and other aircraft.

Accordingly, the vehicle centric collision avoidance system of first aircraft 302 may generate avoidance commands when the range between first aircraft 302 and second aircraft 304 at closest point of approach 310 is within, or "breaches", predefined separation perimeter 316. In other words, avoidance commands may be generated when predicted position 322 of second aircraft 304 at the time to closest point of approach 310 is within separation perimeter 316 for first aircraft 302 with respect to predicted position 320 for first aircraft 302 at the time to closest time of approach 310.

In some illustrative examples, avoidance commands may only be generated when the time to closest point of approach is within a selected time boundary. For example, if the time to closest point of approach 310 is over five minutes away, the vehicle centric collision avoidance system of first aircraft 302 may not generate avoidance commands until the time to closest point of approach 310 reaches about one minute.

The avoidance commands that are generated may be configured to alter flight path 306 of first aircraft 302. In some cases, the avoidance commands that are generated may also alter the speed of the aircraft.

For example, the vehicle-centric collision avoidance system of first aircraft 302 may generate one or more avoidance commands that cause first aircraft 302 to reactively alter flight path 306 of first aircraft 302 to altered flight path 314 in response to predicted position 322 for second aircraft 304 being within separation perimeter 316 when first aircraft 302 has predicted position 320. In this manner, the vehicle-centric collision avoidance system in first aircraft 302 may automatically ensure that proper separation, as defined by separation perimeter 316, is maintained between first aircraft 302 and second aircraft 304 at substantially all times.

When flight path 306 of first aircraft 302 is altered to altered flight path 314, the vehicle-centric collision avoidance system in first aircraft 302 predicts a new closest point of approach between first aircraft 302 and second aircraft 304 that is different from closest point of approach 310. The new closest point of approach is predicted to occur when first aircraft 302 is at predicted position 324 along altered flight path 314.

The portion of airspace 305 defined within separation perimeter 316 when first aircraft 302 is at predicted position 324 along altered flight path 314 is different than the portion of airspace 305 defined within separation perimeter 316 when first aircraft 302 is at predicted position 322 along flight path 306. Altered flight path 314 for first aircraft 302 may be selected such that the predicted position for second aircraft 304 at the new closest point of approach is outside of separation perimeter 316 for first aircraft 302 when first aircraft 302 is at predicted position 324 for the new closest point of approach.

The vehicle-centric collision avoidance system of first aircraft 302 may continuously monitor for aircraft traffic in airspace 305, while first aircraft 302 is on altered flight path 314. In particular, the vehicle-centric collision avoidance system of first aircraft 302 may continuously identify the closest point of approach for first aircraft 302 as first aircraft 302 and second aircraft 304 travel in airspace 305. Further, the vehicle-centric collision avoidance system may continuously predict whether second aircraft 304 will be present in the portion of airspace 305 within separation perimeter 316 at the time predicted for the closest point of approach.

In this manner, first aircraft 302 may continue to generate avoidance commands to cause first aircraft 302 to alter its flight path until second aircraft 304 is no longer predicted to be within separation perimeter 316 for first aircraft 302 at the time predicted for the closest point of approach between first aircraft 302 and second aircraft 304. In other words, first aircraft 302 may return to flight path 306 when the vehicle-centric collision avoidance system of first aircraft 302 determines that the potential for a breach of separation perimeter 316 no longer exists.

In other illustrative examples, a plurality of separation perimeters may be predefined in the vehicle-centric collision avoidance system of first aircraft 302. For example, separation perimeter 316 may include multiple desired levels of separation or separation perimeter layers. As further described below, the plurality of separation perimeter layers may be defined based on temporal parameters, aircraft velocity, aircraft rates of motion, distance parameters, relative velocity, relative rates of motion, and/or other suitable parameters.

Figure 4:
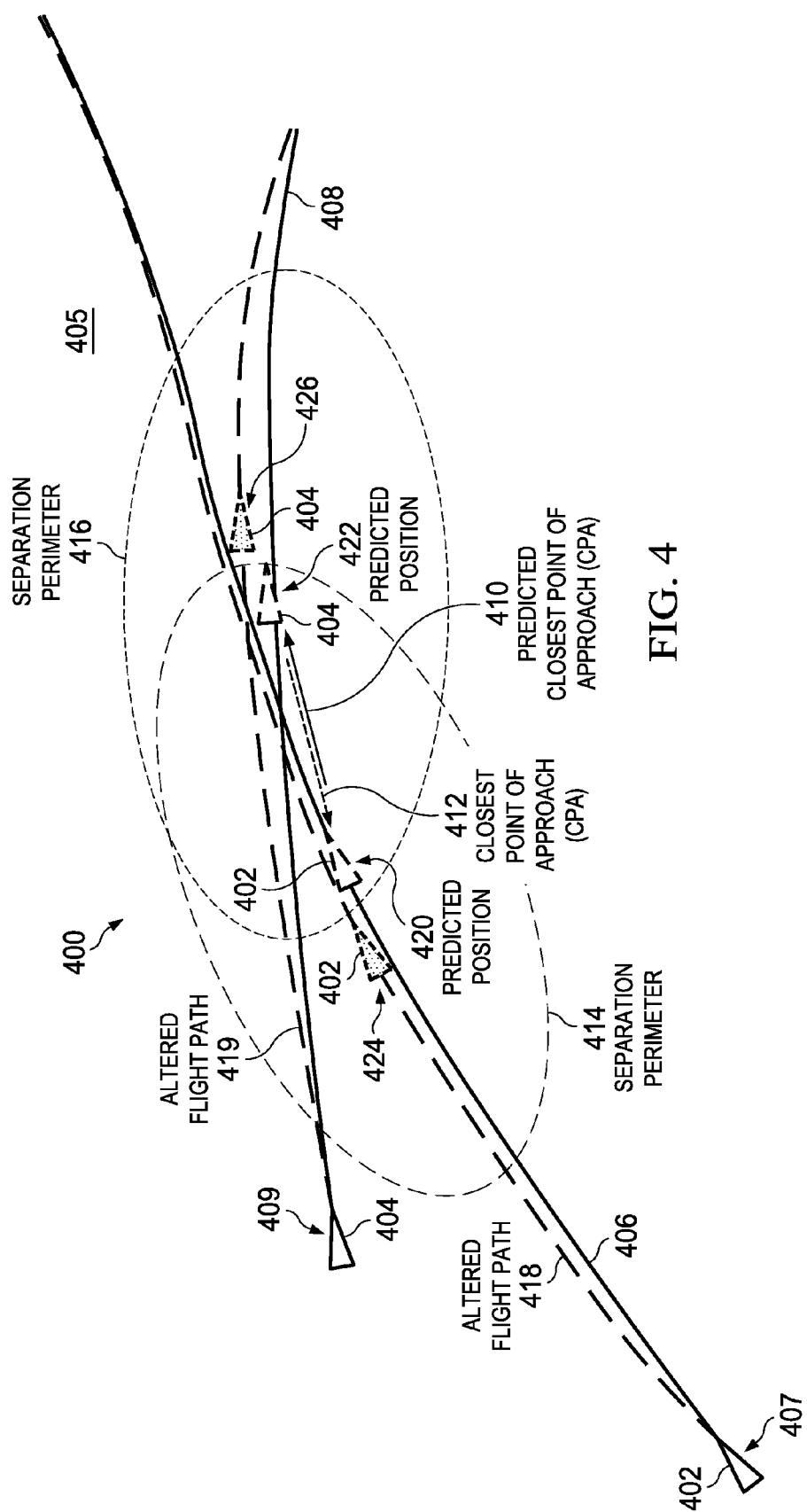
FIG. 4 is an illustration of another air traffic management environment in accordance with an advantageous embodiment.

With reference now to FIG. 4, an illustration of another air traffic management environment is depicted in accordance with an advantageous embodiment. In this illustrative example, air traffic management environment 400 is another example of one implementation for vehicle management environment 100 in FIG. 1.

As depicted, air traffic management environment 400 in FIG. 4 includes first aircraft 402 and second aircraft 404. First aircraft 402 and second aircraft 404 are both equipped with a vehicle-centric collision avoidance system in this depicted example. The vehicle-centric collision avoidance systems of first aircraft 402 and second aircraft 404 may operate in a manner similar to the manner described for the vehicle-centric collision avoidance system of first aircraft 302 in FIG. 3.

As depicted, first aircraft 402 is traveling on flight path 406 in airspace 405, while second aircraft 404 is traveling on flight path 408 in airspace 405. First aircraft 402 is currently at position 407 along flight path 408. Second aircraft 404 is currently at position 409.

The vehicle-centric collision avoidance system of first aircraft 402 may be configured to predict closest point of approach 410 with respect to first aircraft 402. Likewise, the vehicle-centric collision avoidance system of second aircraft 404 may be configured to predict closest point of approach 412 with respect to second aircraft 404.

Closest point of approach 410 and closest point of approach 412 indicate the smallest range that is predicted to occur between first aircraft 402 and second aircraft 404 as these aircraft continue on flight path 406 and flight path 408, respectively. In this illustrative example, closest point of approach 410 and closest point of approach 412 are predicted to occur when first aircraft 402 is at predicted position 420 along flight path 406 and when second aircraft 404 is at predicted position 422 along flight path 408.

Further, the vehicle-centric collision avoidance system of first aircraft 402 may predict a time to closest point of approach 410 for first aircraft 402, while the vehicle-centric collision avoidance system of second aircraft 404 may predict a time to closest point of approach 412 for second aircraft 404. Additionally, making the prediction of closest point of approach 410 and closest point of approach 412 may include identifying the current range between first aircraft 402 and second aircraft 404. The current range includes the distance between position 407 of first aircraft 402 and position 409 of second aircraft 404, as well as a direction of position 409 for second aircraft 404 with respect to position 407 for first aircraft 402.

Separation perimeter 414 for first aircraft 402 may be predefined in the vehicle-centric collision avoidance system of first aircraft 402. Similarly, separation perimeter 416 for second aircraft 404 may be predefined in the vehicle collision avoidance system of second aircraft 404.

Accordingly, the vehicle-centric collision avoidance system of first aircraft 402 may generate avoidance commands when the range between first aircraft 402 and second aircraft 404 at closest point of approach 410 is within, or "breaches", predefined separation perimeter 414. In other words, avoidance commands may be generated when predicted position 422 for second aircraft 404 is within separation perimeter 414 for first aircraft 402 when first aircraft 402 is at predicted position 420.

In a corresponding fashion, the vehicle-centric collision avoidance system of second aircraft 404 may produce avoidance commands when the range between first aircraft 402 and second aircraft 404 at closest point of approach 412 is within, or "breaches", predefined separation perimeter 416. In other words, avoidance commands may be generated when predicted position 420 for first aircraft 402 is within separation perimeter 416 for second aircraft 404 when second aircraft 404 is at predicted position 422.

The avoidance commands generated by each of the vehicle-centric collision avoidance systems of first aircraft 402 and first aircraft 402 may cause first aircraft 402 and second aircraft 404 to alter flight path 406 and flight path 408, respectively. Further, the avoidance commands may also alter the speed of the aircraft in some illustrative examples.

For example, as shown in FIG. 4, the vehicle-centric collision avoidance system of first aircraft 402 may generate one or more avoidance commands that cause first aircraft 402 to reactively alter flight path 406 to altered flight path 418. Similarly, the vehicle-centric collision avoidance system of second aircraft 404 may generate one or more avoidance commands that cause second aircraft 404 to alter flight path 408 to altered flight path 419.

The vehicle-centric avoidance systems of first aircraft 402 and second aircraft 404 may predict a new closest point of approach for altered flight path 418 and altered flight path 419. The new closest point of approach may be predicted to occur when first aircraft 402 is at predicted position 424 and second aircraft 404 is at predicted position 426. As illustrated in FIG. 4, predicted position 424 for first aircraft 402 is outside of separation perimeter 416 for second aircraft 404 and predicted position 426 for second aircraft 404 is outside of separation perimeter 414 for first aircraft 402 at the time predicted for the new closest point of approach.

In this manner, the vehicle-centric collision avoidance systems of first aircraft 402 and second aircraft 404 may automatically ensure that proper separation, as defined by separation perimeter 414 and separation perimeter 416, respectively, is maintained at substantially all times. However, first aircraft 402 and/or second aircraft 404 may return to flight path 406 and/or flight path 408, respectively, when the vehicle-centric collision systems of these aircraft determine that the potential for a breach of separation perimeter 414 and/or separation perimeter 416, respectively, no longer exists.

In other illustrative examples, a plurality of separation perimeter layers may be predefined in the vehicle-centric collision avoidance system of first aircraft 402 and/or second aircraft 404. For example, separation perimeter 414 and/or separation perimeter 416 may include multiple separation perimeter layers. As further described below, the plurality of separation perimeter layers may be defined based on temporal parameters, aircraft velocity, aircraft motion rates, distance parameters, relative rates of motion, relative velocity, and/or other suitable parameters. One of the temporal parameters may be the time to the closest point of approach.

Accordingly, the capability to automatically alter the flight paths for aircraft may reduce or eliminate the risk of collisions due to human error, miscommunication associated with current collision avoidance systems, and/or other factors. Additionally, the vehicle-centric avoidance system of an aircraft may decrease the workload of ground-based air traffic controllers by diminishing their involvement in mitigating potential aircraft collisions.

The illustrations of FIG. 3 and FIG. 4 are not meant to imply limitations to the manner in which the different advantageous embodiments may be implemented. For example, in some illustrative examples, other aircraft in addition to first aircraft 302 and second aircraft 304 may be present in air traffic management environment 300.

As one illustrative example, the vehicle-centric collision avoidance system of first aircraft 402 may be configured to generate avoidance commands to alter flight path 406 for first aircraft 402 to an altered flight path other than altered flight path 418 when more than one aircraft is predicted to be present within separation perimeter 414 for first aircraft 402 at the time at which closest point of approach 410 is predicted to occur.

Figure 5:
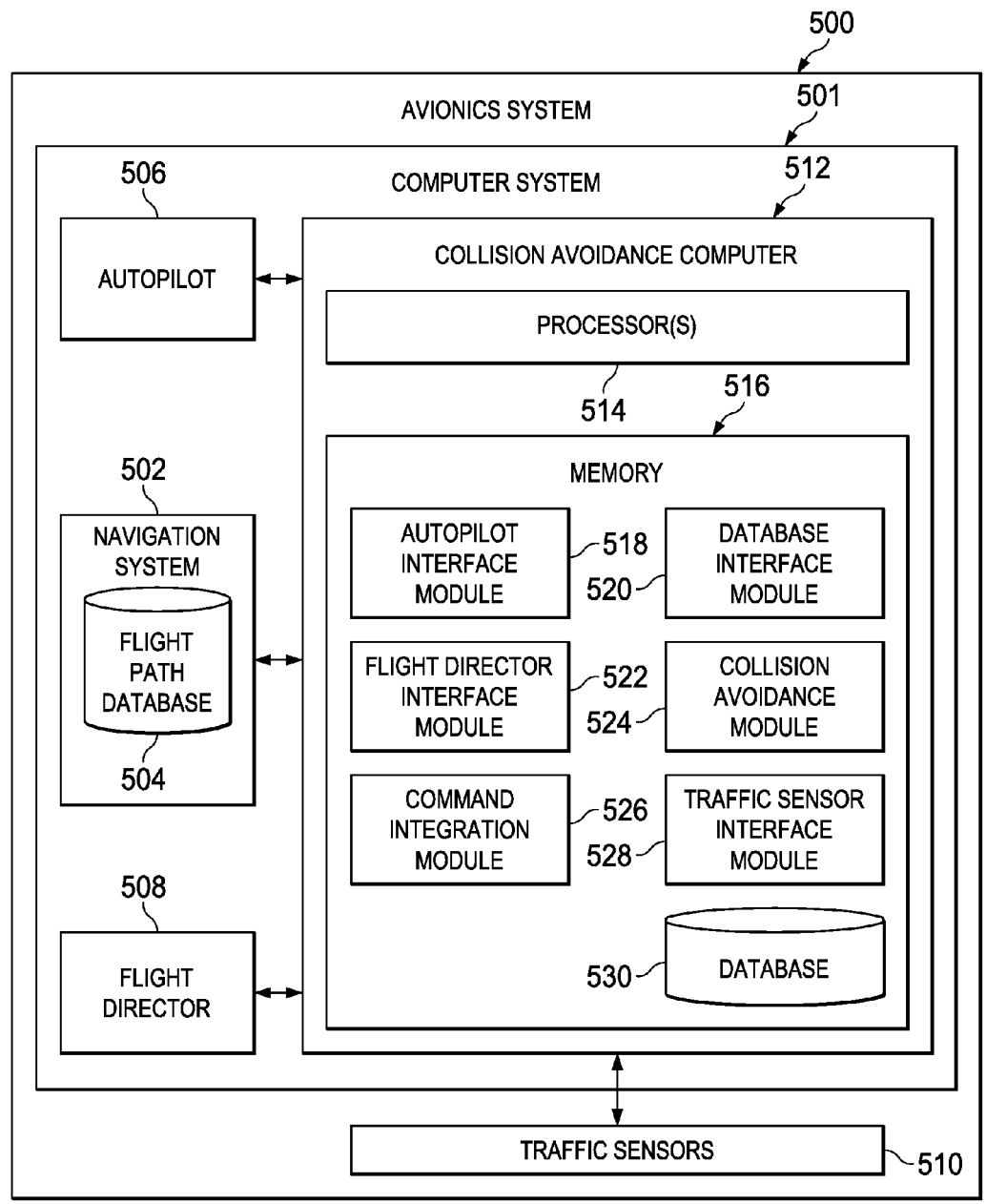
FIG. 5 is an illustration of a block diagram of an avionics system that provides collision avoidance in accordance with an advantageous embodiment.

With reference now to FIG. 5, an illustration of a block diagram of an avionics system that provides collision avoidance is depicted in accordance with an advantageous embodiment. Avionics system 500 may be implemented in an aircraft, such as, for example, first aircraft 104 in FIG. 1, first aircraft 302 in FIG. 3, first aircraft 402 in FIG. 4, and/or second aircraft 404 in FIG. 4. The vehicle-centric avoidance systems described for first aircraft 302 in FIG. 3 as well as first aircraft 402 and second aircraft 404 in FIG. 4 may be implemented in avionics system 500.

In these illustrative examples, one or more components in avionics system 500 may be implemented in computer system 501. Computer system 501 is an example of one implementation for computer system 108 in FIG. 1. Computer system 501 takes the form of a number of computers in these examples. When more than one computer is present in computer system 501, these computers may be in communication with each other.

For example, avionics system 500 may include navigation system 502, flight path database 504, autopilot 506, flight director 508, traffic sensors 510, and collision avoidance computer 512. Navigation system 502, autopilot 506, flight director 508, and collision avoidance computer 512 may be implemented in one or more computers in computer system 501. Further, one or more of navigation system 502, autopilot 506, and flight director 508 may be implemented in flight control system 111 in FIG. 1.

Navigation system 502 may be used to provide the geographical position of the aircraft during flight. The geographical position of the aircraft is the position of the aircraft defined using a geographical coordinate system. Navigation system 502 may include an Inertial Reference System (IRS), an Attitude Heading and Reference System (AHRS), a Global Positioning System (GPS), and other similar systems. A portion of these systems may be implemented in computer system 501, while another portion of these systems may comprise sensors and/or other devices external to computer system 501.

In these illustrative examples, navigation system 502 may include flight path database 504 onboard the aircraft. Flight path database 504 provides flight path information for the aircraft. The flight path information includes predetermined flight paths for the aircraft. In some illustrative examples, the flight path information may include predetermined courses for the aircraft. A course for an aircraft is a direction of travel or heading for the aircraft. This direction of travel may be defined, for example, as an angle with respect to true North. A course for an aircraft may also be referred to as a heading.

Autopilot 506 is generally configured to pilot the aircraft without human intervention. In various implementations, autopilot 506 may obtain flight information from navigation system 502. This flight information may include, for example, position, heading, attitude, speed, and/or other suitable types of flight information for the aircraft. Autopilot 506 may also obtain flight path information from flight path database 504.

By comparing the flight information with the flight path information, autopilot 506 may issue control commands to maintain the aircraft on a particular flight path. For example, autopilot 506 may compute throttle settings and issue flight control surface commands.

Flight director 508 is generally configured to compute and display the desired flight path for the aircraft to one or more pilots during a specific flight. For example, when a pilot is following a predetermined course for the aircraft, flight director 508 may interact with flight path database 504 and autopilot 506 to compute and display the necessary flight maneuvers for traveling along the predetermined course to the pilot.

In these illustrative examples, the flight director 508 may include a flight director indicator (FDI), a horizontal situation indicator (HSI), a mode selector, and a flight director computer. Moreover, the flight director indicator may include a display that may present an attitude indicator, a fixed aircraft symbol, pitch and bank command bars, a glide slope indicator, a localizer deviation indicator, and/or other suitable types of indicators.

Flight director 508 may provide a pilot with steering commands necessary to obtain and hold a desired course or flight path. In some illustrative examples, flight director 508 may further provide steering commands to autopilot 506, which autopilot 506 may translate into commands for the flight control surfaces of the aircraft.

Traffic sensors 510 may be configured to obtain positions of traffic aircraft. Traffic aircraft include any number of other aircraft that may be traveling in the airspace through which the aircraft is traveling. According to various embodiments, traffic sensors 510 may be configured to receive traffic data from a Traffic Alert and Collision Avoidance System (TCAS), an Automatic Dependent Surveillance (ADS) system, a ground-based air traffic control (ATC) system, an on-board traffic surveillance radar system, and/or other air traffic detection systems.

As depicted in this example, collision avoidance computer 512 has processing capabilities and memory suitable to store and execute computer-executable instructions. In one embodiment, collision avoidance computer 512 includes one or more processors 514 and memory 516.

Memory 516 may include volatile and nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, compact disc, read-only memory (CD-ROM), digital versatile disks (DVD) or other optical storage, magnetic cassettes, magnetic tape, magnetic disk storage or other magnetic storage devices, redundant array of independent disks (RAID) storage systems, or any other medium which can be used to store the desired information and which can be accessed by a computer system.

Memory 516 contains modules that enable collision avoidance computer 512 to perform various functions. These modules may include autopilot interface module 518, database interface module 520, flight director interface module 522, collision avoidance module 524, command integration module 526, traffic sensor interface module 528, and database 530.

Collision avoidance module 524 and a set of the other modules in memory 516 may be used to implement separation management module 112 in FIG. 1. Further, autopilot interface module 518, database interface module 520, flight director interface module 522, collision avoidance module 524, command integration module 526, traffic sensor interface module 528, and database 530 may be implemented as software and/or computer-executable instructions that are executed by the one or more processors 514 to perform the functions as described below.

Autopilot interface module 518 is configured to enable collision avoidance computer 512 to communicate with autopilot 506. The communication may be established over an electrical connection, an optical connection, and the like. In these illustrative examples, autopilot interface module 518 may be configured to enable autopilot 506 to perform collision avoidance under the direction of collision avoidance computer 512.

Database interface module 520 enables the reading of data from and writing of data to database 530. In these illustrative examples, database interface module 520 may be activated by the other modules in memory 516, as further described below. Database 530 may be configured to store information that may be used to maintain the aircraft on various flight paths as well as avoid collisions.

For instance, database 530 may contain trajectory and speed laws. The trajectory and speed laws may dictate the performance capabilities and maneuver capabilities of the aircraft. Moreover, database 530 may also store aircraft separation limits and aircraft response limits.

The aircraft separation limits may be used to define a separation perimeter, such as separation perimeter 316 described in FIG. 3. These stored limits may be used to determine the dimensions and shape of the separation perimeter. For example, the parameters may specify measurements such as diameter, width, length, and height, and/or other measurements for defining the separation perimeter. The aircraft response limits, as further described below, may dictate a maximum desired proximity between the aircraft and other aircraft and the minimum time at which the aircraft is to alter its flight path to mitigate the potential of a collision.

Of course, other information may also be used in determining the shape of the separation perimeter. These factors may include, for example, without limitation, weather conditions, altitude, visibility conditions, wind conditions, terrain over which the aircraft are flying, a number of passengers in the aircraft, and/or other suitable factors.

Flight director interface module 522 may facilitate the communication between flight director 508 and collision avoidance module 524. Accordingly, flight director interface module 522 may enable flight director 508 to provide a pilot with the necessary steering commands.

Traffic sensor interface module 528 may be configured to provide traffic sensor data from traffic sensors 510 to collision avoidance computer 512. Collision avoidance module 524 in collision avoidance computer 512 may analyze the traffic sensor data received from traffic sensor interface module 528. Collision avoidance module 524 may alter the current flight path of the aircraft if the aircraft cannot maintain the desired level of separation between the aircraft and other aircraft along the current flight path.

Command integration module 526 may be configured to use autopilot interface module 518 and flight director interface module 522 to respectively send collision avoidance commands, flight path changes, and/or new flight path information to autopilot 506 and flight director 508.

Figure 6:
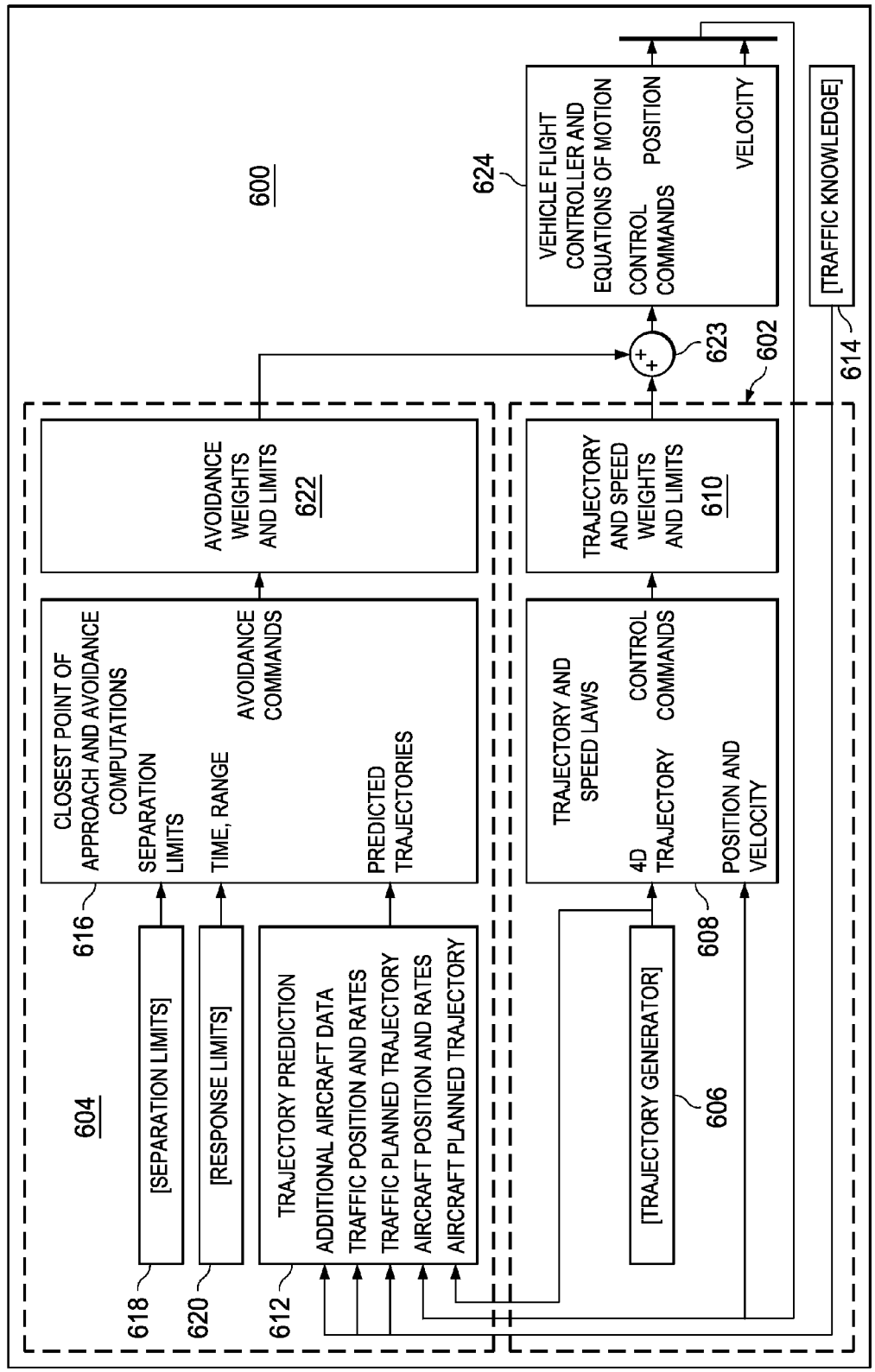
FIG. 6 is an illustration of a block diagram of a collision avoidance system in accordance with an advantageous embodiment.

With reference now to FIG. 6, an illustration of a block diagram of a collision avoidance system is depicted in accordance with an advantageous embodiment. In this illustrative example, system 600 is a collision avoidance system. In particular, system 600 may be used to implement a vehicle-centric collision avoidance system in an aircraft such as, for example, first aircraft 104 in FIG. 1, first aircraft 302 in FIG. 3, first aircraft 402 in FIG. 4, and/or second aircraft 404 in FIG. 4.

As depicted, system 600 may include flight control module 602 and collision avoidance module 604. Flight control module 602 is generally configured to maintain an aircraft on predetermined flight paths as the aircraft travels between various destinations. Collision avoidance module 604 is configured to generate avoidance commands that may provide collision avoidance. Collision avoidance module 604 and flight control module 602 may be implemented using software, hardware, or a combination of both.

In this illustrative example, flight control module 602 may include trajectory generator function 606, control command function 608, and command modification function 610. These functions may be carried out by one or more of navigation system 502, autopilot 506, and flight director 508 in avionics system 500 in FIG. 5.

Trajectory generator function 606 is configured to generate flight trajectories for the aircraft based on predetermined waypoints for the aircraft. In these illustrative examples, a flight trajectory for an aircraft is a number of waypoints identified for the aircraft to pass during flight such that the aircraft maintains a desired flight path. Waypoints are positions in airspace. These positions may be positions defined using, for example, a geographical coordinate system.

In these illustrative examples, the number of waypoints identified by the flight trajectory includes future waypoints to be passed and may not include waypoints that have already been passed by the aircraft during flight. In some cases, the flight trajectory may include the number of waypoints predicted to be passed by the aircraft when the aircraft maintains a desired flight path.

In some illustrative examples, the flight trajectory may also indicate the path between each pair of waypoints in number of waypoints to be traveled by the aircraft. In this manner, the flight trajectory may include the desired flight path as well as an identification of the number of waypoints to be passed along the desired flight path.

The flight trajectory may also include the times at which the number of waypoints is to be passed by the aircraft. When the flight trajectory includes time information, the flight trajectory may be referred to as a four-dimensional (4D) flight trajectory. When the flight trajectory does not include the time information, the flight trajectory may be referred to as a three-dimensional flight trajectory.

Control command function 608 is configured to compare a generated flight trajectory with a current position and current velocity of the aircraft. Control command function 608 determines whether the aircraft is deviating and/or will deviate from the generated flight trajectory and whether flight path corrections are needed. Flight path corrections are changes to the current flight path and/or heading that the aircraft is following.

When flight path corrections are needed, control command function 608 may produce control commands that implement the flight path corrections according to trajectory and speed control laws. The control commands may be configured to change throttle settings for the propulsion system of the aircraft and/or manipulate operation of the flight control surfaces of the aircraft.

In some illustrative examples, the control commands produced by control command function 608 may be further processed by command modification function 610 before they are implemented on the propulsion system and respective flight control surfaces. Specifically, command modification function 610 may be configured to implement the control commands as a function of flight conditions using gains, also referred to as weights and/or limits.

For example, command modification function 610 may assign a high weight value to one or more control commands when the aircraft has severely deviated from a flight path. The high weight value may cause the one or more control commands to be expediently implemented to a high degree so as to cause the aircraft to quickly return to the designated flight path.

Conversely, command modification function 610 may assign a low weight value to one or more control commands when the aircraft experiences only a slight deviation from the flight path. In such an instance, the control commands may be gradually implemented such that the return of the aircraft to the designated flight path is more gradual or measured. Further, the control commands may be implemented in a manner that takes into passenger comfort, ride quality, safety factors, and/or other suitable factors.

In these illustrative examples, collision avoidance module 604 may interact with flight control module 602 to alter the flight path of the aircraft during flight to provide collision avoidance when needed. Collision avoidance module 524 in collision avoidance computer 512 in FIG. 5 may be used to implement the functions carried out in collision avoidance module 604.

As depicted, collision avoidance module 604 of system 600 may issue avoidance commands that compete with the control commands provided by flight control module 602. In this way, the avoidance commands may alter a flight trajectory and/or flight path of the aircraft to provide collision avoidance. In these illustrative examples, collision avoidance module 604 includes trajectory analysis function 612, computations function 616, separation limits 618, response limits 620, and avoidance modification function 622.

Trajectory analysis function 612 may be configured to predict the flight path of the aircraft with respect to the flight paths of other traffic aircraft. Trajectory analysis function 612 may obtain traffic knowledge 614 from traffic sensor 510 via traffic sensor interface module 528 in FIG. 5. Traffic knowledge 614 may include the position, velocity, heading, heading rate of change, climb rates, descend rates, velocity rate of change, and trajectory of the traffic aircraft.

In other instances, traffic knowledge 614 may also include the flight plans of particular traffic aircraft. A flight plan includes a predetermined flight trajectory for the particular traffic aircraft. In other words, the flight plan may include the predetermined flight path for the particular traffic aircraft and times associated with different waypoints along the predetermined flight path.

For example, if a traffic aircraft has filed a flight plan, trajectory analysis function 612 may obtain the flight plan from a ground source, such as, for example, a flight plan database at a ground-based control station. The flight plan obtained may provide trajectory analysis function 612 with detailed knowledge regarding the positions at which the traffic aircraft will be at particular moments in time.

However, in other illustrative examples, the flight management system (FMS) of a traffic aircraft may be capable of transmitting position and rate data to other aircraft. In these examples, trajectory analysis function 612 may also obtain traffic knowledge 614 directly from the traffic aircraft.

Additionally, trajectory analysis function 612 may acquire the predicted flight path of the aircraft in which system 600 is implemented from trajectory generator function 606. The aircraft on which system 600 is implemented also may be referred to as the self-aircraft in these illustrative examples.

Once the trajectory analysis function 612 has received trajectory data from the various sources, trajectory analysis function 612 may process the data to determine the desired trajectory information. This desired trajectory information may include the position of the self-aircraft; the rates of the self-aircraft; the planned trajectory of the self-aircraft; the position of each traffic aircraft; the rates of each traffic aircraft; and the planned trajectory of each traffic aircraft. As used herein, rates for the self-aircraft and each traffic aircraft may include rates of heading change, climb rates, descend rates, velocity, and rates of velocity change. Rates of velocity change are also referred to as acceleration.

In this manner, trajectory analysis function 612 may predict the expected flight path of each aircraft for which it has been provided with data. Trajectory analysis function 612 may be configured to send the predicted trajectories to computations function 616.

Computations function 616 may be configured to process the predicted trajectories of the different aircraft and provide avoidance commands to the self-aircraft when a loss of separation has been identified. Specifically, the predicted trajectories of the different aircraft may be used to predict whether any of the traffic aircraft will "breach" a predetermined separation perimeter for the self-aircraft at the closest point of approach between the self-aircraft and each of the traffic aircraft.

For instance, if at least one of the traffic aircraft is predicted to be inside the separation perimeter at the closest point of approach between the traffic aircraft and the self-aircraft, then the separation perimeter is predicted to be "breached". When computations function 616 reaches such a prediction, computations function 616 may be configured to issue avoidance commands.

These avoidance commands may preemptively alter the flight path of the self-aircraft such that the separation perimeter is not "breached" at the predicted closest point of approach. In this manner, computations function 616 generates the avoidance commands needed to provide the desired level of separation between the aircraft and other aircraft. Further, a collision avoidance module similar to collision avoidance module 604 may be present on each traffic aircraft and may issue avoidance commands to each traffic aircraft when necessary.

In these depicted examples, computations function 616 uses separation limits 618 to determine the dimensions of the separation perimeter for the aircraft. In one illustrative example, separation limits 618 may define a minimum separation distance that extends in all directions. In this manner, the separation perimeter may be in the form of a sphere. For example, a separation perimeter may be established based on the separation distance of one mile in all directions. In other words, a traffic aircraft is considered to have "breached" the separation perimeter for the self-aircraft if the traffic aircraft is predicted to be closer than one mile away from the aircraft at the closest point of approach predicted between the self-aircraft and the traffic aircraft.

In other illustrative examples, separation limits 618 may be configured to provide other separation perimeter shapes. For example, separation limits 618 may define a radius that extends in all longitudinal and latitudinal directions, and a fixed distance in the vertical axis for all points that extend from the longitudinal and latitudinal directions. In this case, separation limits 618 may define a cylindrical space.

Of course, in other illustrative examples, separation limits 618 may be configured to define a variety of other three-dimensional shapes, such as, for example, an ellipsoid, a spheroid, a half sphere, a cube, an octahedron, and/or some other suitable three-dimensional shape. In other words, the three-dimensional shapes may not be symmetrical.

In some cases, uncertainty in the prediction of the closest point of approach may be directionally dependent. In other words, the uncertainty may be different in different directions with respect to the aircraft. As a result, the shapes defined by separation limits 618 may be non-symmetrical when the uncertainty in the prediction of the closest point of approach is different in different directions with respect to the aircraft.

Further, separation limits 618 may define different three-dimensional shapes for the separation perimeter for an aircraft based on different types of aircraft. For example, when the self-aircraft is a particular type of aircraft, the separation perimeter defined for the self-aircraft and a traffic aircraft of a first type may be different from the separation perimeter defined for the self-aircraft and a traffic aircraft of a second type.

As one illustrative example, the three-dimensional shape of a separation perimeter defined by separation limits 618 may be based on the class of self-aircraft and/or the class of the traffic aircraft class. The class of an aircraft may be, for example, a heavy commercial aircraft, a light private aircraft, a jet, a helicopter, and/or some other suitable class of aircraft. The three-dimensional shapes for the separation perimeter also may be defined based on maneuverability of the self-aircraft and/or traffic aircraft, as well as the speed of the self-aircraft and/or traffic aircraft.

Computations function 616 may be further configured to use response limits 620 in the generation of avoidance commands. Response limits 620 may determine the promptness at which the avoidance commands are carried out.

For example, response limits 620 may be established such that when the predicted closest point of approach between the self-aircraft and a traffic aircraft is predicted to occur at a distance from the self-aircraft's current position that is substantially equal to or greater than some selected threshold, computations function 616 may delay the provision of the one or more avoidance commands. Conversely, if the predicted closest point of approach between the self-aircraft and the traffic vehicle is predicted to occur at a distance from the self-aircraft's current position that is less than the selected threshold, computations function 616 may immediately provide the one or more avoidance commands for execution by the self-aircraft.

In some illustrative examples, computations function 616 may be configured to compute the time to closest point of approach ($t_{cpa}$). This time may also be referred to as a time-to-go to the closest point of approach. In these examples, response limits 620 may also include time limitations. For example, if the time to closest point of approach is predicted to occur at a time in the future that is substantially equal to or later than some selected threshold, computations function 616 may delay avoidance command execution.

For example, the time to closest point of approach may be later than the selected threshold by being a time beyond a predetermined time interval. This predetermined time interval may be in any type of units for time increments, such as, for example, seconds, minutes, hours, and/or some other increments for time.

Conversely, the time to closest point of approach is imminent in time. For example, when the time to closest point of approach is predicted to occur at a time earlier than some selected threshold, such as before a predetermined time interval will elapse, computations function 616 may more rapidly provide the avoidance commands for execution. Furthermore if the time to closest point of approach is negative, then the closest point of approach has already occurred and the aircraft are moving away from one another. In this case, the avoidance command may be set to zero.

In this manner, computations function 616 may prioritize the generation of avoidance commands based on the imminence of the potential collision with each of a plurality of traffic aircraft. For example, the computation of time to closest point of approach and the implementation of time limitations in response limits 620 may be suitable for collision avoidance between aircraft with long times-to-go for a closest point of approach. Longer times-to-go for a closest point of approach may be predicted between two aircraft that are flying in formation at close range along parallel paths, trailing one another, or heading on trajectories at a far range from each other with near zero closest point of approach distance.

In these illustrative examples, avoidance modification function 622 may be configured to assign gain, or avoidance weights, to the one or more avoidance commands generated by computations function 616. Avoidance weights may be used to establish the relative strength of the avoidance and steering commands.

For example, avoidance modification function 622 may contain a low gain for a long range first separation perimeter layer and a high gain for a near range second separation perimeter layer. In this example, the first separation perimeter layer may enable separation using minor path corrections at far range. Also in this example, the second perimeter layer may ensure the ability of the avoidance commands to overcome the normal control commands issued by control command function 608 in flight control module 602 at near range using higher gains.

As a result, avoidance computations function 616 and avoidance modification function 622 may increase the tendency of the self-aircraft to alter its flight path as it closes in on the traffic aircraft. Moreover, it will be appreciated that avoidance modification function 622 may be configured to assign various gains to the avoidance commands for each separation perimeter and each traffic aircraft.

In other illustrative examples, avoidance modification function 622 may be further configured to assign gains that selectively implement a portion of the avoidance commands. For example, avoidance modification function 622 may be configured to assign no weight to an avoidance command component that causes an aircraft to dive when the aircraft is below a predetermined minimum altitude. This may prevent the aircraft from performing undesired flight path alterations. In some illustrative examples, avoidance modification function 622 may be configured to assign substantially zero weight to avoidance command components that turn the aircraft in a particular direction, such as, for example, right or left.

Avoidance modification function 622 may be further configured to constrain the avoidance commands with control limits. For example, avoidance modification function 622 may provide control limits that prevent avoidance commands from being implemented when the deviations from the flight path are negligible. In other examples, both command modification function 610 and avoidance modification function 622 may use control limits to prevent radical movements of the aircraft or command saturation of the flight control system in the aircraft.

Once avoidance modification function 622 has assigned the necessary gains and/or limits to the avoidance commands, the avoidance commands are passed to, for example, command integration module 526 in FIG. 5. Command integration module 526 may implement the functions performed by integration component 623 and command integration module 624.

In particular, integration component 623 applies the avoidance commands to the control commands and sends these integrated commands to command integration module 624. As described above, the control commands are produced by control command function 608 and modified by command modification function 610.

The avoidance commands generated may include, for example, heading rate change commands, climb or descend rate modification commands, acceleration and deceleration commands, and/or other steering commands such as speed, altitude, and heading alteration commands. In other words, the avoidance commands may be configured to affect computations of thrust and flight control surface settings in command integration module 624.

In various embodiments, command integration module 624 may implement the avoidance commands so that they compete with the control commands issued by control command function 608 as weighted and limited by command modification function 610. In this way, collision avoidance module 604 may alter the flight path of an aircraft when collision avoidance module 604 predicts that a "breach" of the separation perimeter is expected.

Additionally, command integration module 624 may also provide position and rate readings back to the control command function 608, and trajectory analysis function 612. Further, the position and velocity readings may be passed back to autopilot 506, flight director 508, and/or some other system in avionics system 500. In turn, control command function 608 may use the feedback position and velocity readings to generate further control commands in the same process as described above. Likewise, trajectory analysis function 612 may use the feedback position and velocity readings to continuously update its flight trajectory predictions.

It will be appreciated that collision avoidance module 604 may be configured to continuously monitor the trajectories of the self-aircraft and the traffic aircraft and predict future "breaches" of the separation perimeter by the closest point of approach between the aircraft and other aircraft. This continuous monitoring may ensure that the flight path of the aircraft is altered each time a loss of separation is predicted.

However, collision avoidance module 604 may terminate the output of the avoidance commands when the trajectories of the aircraft and the traffic aircraft indicate that the separation perimeter is no longer being breached by the closest point of approach. In this manner, small flight path alterations may be continuously made to mitigate potential risks of collisions. In some illustrative examples, collision avoidance module 604 may generate the avoidance commands even when a pilot is in control of the aircraft.

Figure 7:
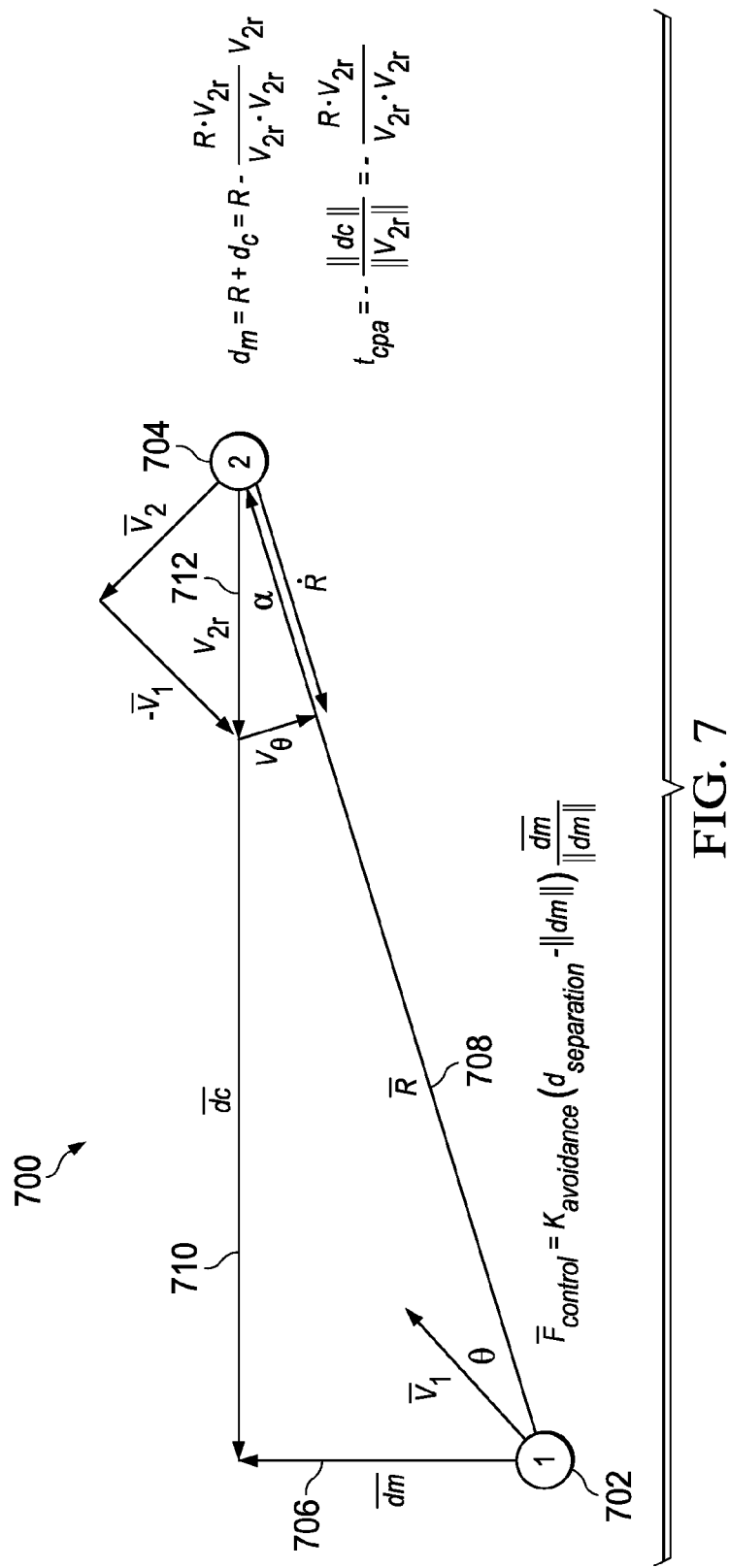
FIG. 7 is an illustration of equations for predicting a closest point of approach between two aircraft in accordance with an advantageous embodiment.

With reference now to FIG. 7, an illustration of equations for predicting a closest point of approach between two aircraft is depicted in accordance with an advantageous embodiment. In particular, examples of equations for predicting a closest point of approach between first aircraft 702 and second aircraft 704 are depicted. These equations are an example of one implementation for predicting closest point of approach 121 between first aircraft 104 and second aircraft 105 in FIG. 1. Moreover, FIG. 7 also illustrates the generation of avoidance commands.

As shown in FIG. 7, assuming that first aircraft 702 and second aircraft 704 continue along straight paths with constant velocities, the closest point of approach between first aircraft 702 and second aircraft 704 may be represented by the equation:

$$\overline{d}_m = \overline{R} + \overline{d}_c = \overline{R} - \frac{\overline{R} \cdot \overline{V}_{2r}}{\overline{V}_{2r} \cdot \overline{V}_{2r}} \overline{V}_{2r} \quad (5)$$

wherein $\overline{d}_m$ is vector 706 for the closest point of approach vector, $\overline{R}$ is vector 708 for the current range between first aircraft 702 and second aircraft 704, $\overline{d}_c$ is vector 710 for the predicted distance traveled by second aircraft 704 relative to first aircraft 702 between the current time and the time to the closest point of approach, and $\overline{V}_{2r}$ is vector 712 for the velocity of second aircraft 704 relative to first aircraft 702.

Furthermore, the time at the closest point of approach may be represented by the equation:

$$t_{cpa} = -\frac{\|\overline{d}_c\|}{\|\overline{V}_{2r}\|} = -\frac{\overline{R} \cdot \overline{V}_{2r}}{\overline{V}_{2r} \cdot \overline{V}_{2r}}, \quad (6)$$

where $t_{cpa}$ is the time at the closest point of approach and $$\frac{\|\overline{d}_c\|}{\|\overline{V}_{2r}\|}$$

is the norm of vector 710 for the relative distance predicted to be traveled, $\overline{d}_c$, between first aircraft 702 and second aircraft 704 over the norm of the vector for the velocity, $\overline{V}_{2r}$, of second aircraft 704 relative to first aircraft 702.

The control avoidance control law for the generation of a vehicle-centric avoidance command, $\overline{F}_{control}$, may be represented by the equation:

$$\overline{F}_{control} = -\sum_{1}^{n} \sum_{1}^{p} K_{p,n} \cdot \overline{C}_{p,n} \quad (7)$$

where $$\overline{C}_{p,n} = Cx_{p,n} \cdot \overline{i}_x + Cy_{p,n} \cdot \overline{i}_y + Cz_{p,n} \cdot \overline{i}_z \quad (8)$$

and wherein p represents the number of separation perimeter layers, n represents the number of traffic aircraft used in the generation of an avoidance command.

Additionally, $K_{p,n}$ may be the control gains applied to each respective control direction ($\overline{i}_x$, $\overline{i}_y$, $\overline{i}_z$) for each respective traffic aircraft n under evaluation by the self-aircraft and for any of a number of respective separation perimeter layers p. Additionally, $\overline{C}_{p,n}$ comprises the corresponding collision avoidance command components used in the generation of one or more avoidance commands.

According to various embodiments, $\overline{C}_{p,n}$ may be selected as follows:

$$\overline{C}_{p,n} = (d_p - \|\overline{dm}_n\|)\frac{\overline{dm}_n}{\|\overline{dm}_n\|} \quad (9)$$

where $d_p$ is the desired separation distance for each separation perimeter layer evaluated, and which may be measured along the closest point of approach (CPA) distance vector $\overline{dm}_n$.

If the control gains are equal in each control direction and the same for each traffic aircraft then a single avoidance gain may be defined as follows:

$$K_{p,n} = k_{avoidance}, \text{ for all } (p,n) \quad (10)$$

Thus, in this example, the avoidance command may reduce to:

$$\overline{F}_{control} = -k_{avoidance} \sum_{1}^{n} \sum_{1}^{p} (d_p - \|\overline{dm}_n\|) \frac{\overline{dm}_n}{\|\overline{dm}_n\|} \quad (11)$$

Further by example, if there is only one traffic aircraft under evaluation, that is, n=1, and only one separation perimeter is evaluated, p=1, then the avoidance command, $\overline{F}_{control}$, may reduce to:

$$\overline{F}_{control} = -k_{avoidance}(d_1 - \|\overline{dm}_1\|) \frac{\overline{dm}_1}{\|\overline{dm}_1\|} \quad (12)$$

wherein $k_{avoidance}$ contains the gain or control weight, $d_1$ is the desired separation distance that may constitute the separation perimeter layer, and $\|\overline{dm}_1\|$ is the norm of the vector for the closest point of approach $\overline{dm}$. Further, $\|\overline{dm}_1\|$ is the distance of the closest point of approach.

As shown, the avoidance command, $\overline{F}_{control}$, provides the force or avoidance command along the direction of the closest point of approach, $\overline{dm}$, to increase the closest point of approach, $\overline{dm}$, between first aircraft 702 and second aircraft 704. Moreover, according to the above equation 8, as the closest point of approach distance $\|\overline{dm}\|$ becomes increasingly smaller, the magnitude of the avoidance command, $\overline{F}_{control}$, will proportionally increase.

In other words, in these illustrative examples, computations function 616 from FIG. 6 may increase the magnitude of the avoidance command as the closest point of approach distance decreases. For example, computations function 616 may provide an avoidance command in the form of an acceleration command that increases the thrust of an aircraft.

The avoidance command functions ($\overline{C}_{p,n}$) may be exponential functions, quadratic functions, or other functions that adjust the control commands as the self-aircraft approaches the closest point of approach. In other embodiments, the avoidance command functions may be functions of other parameters and vectors such as relative velocity and range.

According to some embodiments, the exemplary equations illustrated above may be implemented to establish multiple separation perimeter layers. Each separation perimeter layer may be maintained based on a unique set of values, gains, functions, and separation limits. Moreover, separation perimeter layers may be established based on time, distance, rate, and any combination thereof.

For example, a temporal perimeter layer may be established when the time to closest point of approach is less than a specified separation limit. A rate and distance perimeter layer also may be established, for example, when avoidance command initiation is based on both the magnitude of the relative rate and the range between the self-aircraft and any traffic aircraft. Further, the desired separation distance of a separation perimeter may include a set of distances and reference directions ($\overline{i}_x, \overline{i}_y, \overline{i}_z$) that establish the separation perimeter shape, wherein each direction may have its own avoidance gain. In this way, it will be appreciated that a plurality of different separation perimeter layers may be respectively established between the self-aircraft and each traffic aircraft.

Figure 8:
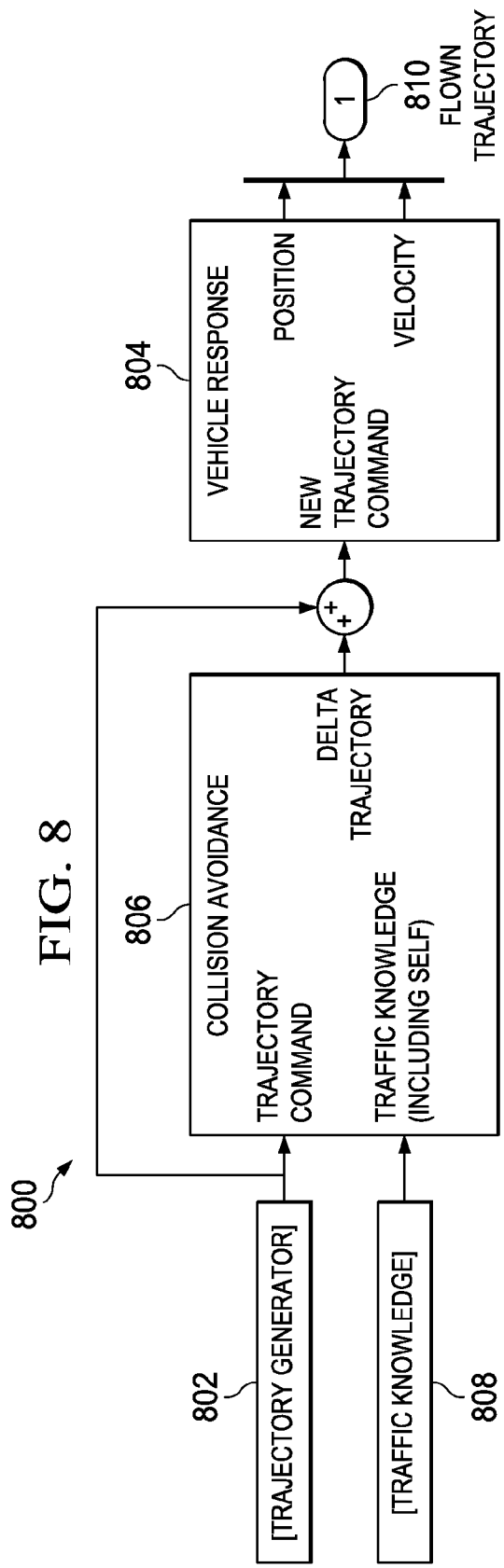
FIG. 8 is an illustration of a vehicle-centric avoidance system in accordance with an advantageous embodiment.

With reference now to FIG. 8, an illustration of a vehicle-centric avoidance system is depicted in accordance with an advantageous embodiment. In this illustrative example, vehicle-centric collision avoidance system 800 may include a flight control system. The flight control system may be configured to maintain an aircraft on predetermined flight trajectories as the aircraft travels between various destinations.

Specifically, the components of the flight control system may include trajectory generator function 802 and vehicle response function 804. The vehicle-centric collision system 800 may also include collision avoidance module 806. Collision avoidance module 806 may be configured to modify the flight trajectories, as provided by trajectory generator function 802 to provide collision avoidance. According to various implementations, the trajectory generator function 802 and/or vehicle response function 804 may be carried out by one or more of navigation system 502, autopilot 506, and flight director 508, as described above in FIG. 5.

Trajectory generator function 802 is configured to produce predicted flight trajectories for an aircraft. In particular, these flight trajectories may be four-dimensional trajectories. Trajectory generator function 802 uses traffic knowledge 808 to predict the flight trajectories. Vehicle response function 804 may be configured to compare a generated flight trajectory with the current position and velocity of the aircraft to determine any deviation and whether any flight path corrections are needed.

Vehicle response function 804 may produce control commands that implement the generated flight trajectories for the aircraft according to trajectory and speed control laws, other control laws, vehicle dynamics, and/or other suitable parameters. The control commands generated may be configured to change the throttle settings for the aircraft and/or manipulate the flight control surfaces of the aircraft to fly the aircraft along trajectory 810.

Collision avoidance module 806 may modify the generated flight trajectory for the aircraft, as produced by trajectory generator function 802, before the flight trajectory is implemented by control commands generated by vehicle response function 804 to fly the aircraft along trajectory 810. In these illustrative examples, the functions performed by collision avoidance module 806 may be carried out by collision avoidance module 524 described in FIG. 5.

Figure 9:
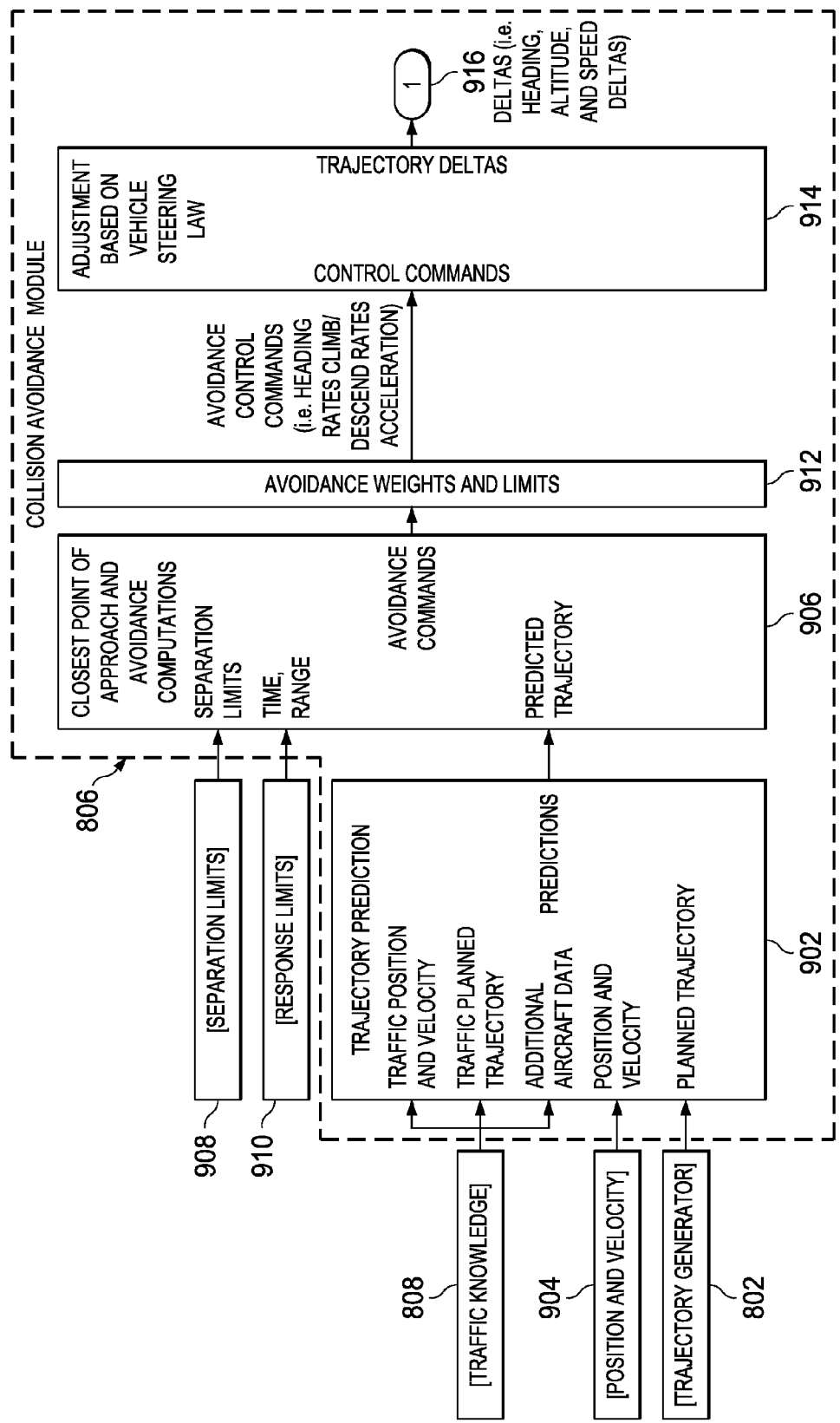
FIG. 9 is an illustration of a collision avoidance module in accordance with an advantageous embodiment.

With reference now to FIG. 9, an illustration of a collision avoidance module is depicted in accordance with an advantageous embodiment. In this illustrative example, the different functions performed by collision avoidance module 806 in FIG. 8 are described in greater detail.

As depicted, collision avoidance module 806 includes trajectory analysis function 902. Trajectory analysis function 902 may be configured to predict the flight path of the aircraft with respect to the flight paths of other traffic aircraft. Trajectory analysis function 902 may obtain traffic knowledge 816 from traffic sensors 510 via traffic sensor interface module 528 in FIG. 5.

Traffic knowledge 816 may include the position, velocity, heading, and trajectory of the traffic aircraft. In other instances, traffic knowledge 816 may also include the flight plans or intent of particular traffic aircraft. For example, if a traffic aircraft has filed a flight plan or an updated intention, trajectory analysis function 902 may obtain the flight plan from a central source, such as a flight plan database or from the flight management system on the traffic aircraft using a data link. The flight plan may provide trajectory analysis function 902 with detailed knowledge regarding the positions of the traffic aircraft at particular moments in time.

Additionally, trajectory analysis function 902 may acquire the predicted trajectory of the aircraft from trajectory generator function 802. Moreover, trajectory analysis function 902 may also acquire position and velocity data 904 for the aircraft from one of autopilot 506 and/or flight director 508 in FIG. 5.

Once trajectory analysis function 902 has received trajectory, position, and velocity data from the various sources, this function may process the data and determine the desired trajectory information. This trajectory information may include the position and rates of the self-aircraft; the planned trajectory of the self-aircraft; the position and rates of each traffic aircraft; and the planned trajectory of each traffic aircraft. In other words, trajectory analysis function 902 may predict the expected flight trajectory of each aircraft for which it has been provided with data. Moreover, trajectory analysis function 902 may be configured to pass the predicted trajectories to computations function 906.

Computations function 906 may be configured to process the predicted trajectories of the aircraft and provide aircraft avoidance commands. Specifically, the predicted trajectories of the aircraft may be used to predict whether a traffic aircraft will "breach" the separation perimeter for the self-aircraft at the closest point of approach between the two aircraft.

For instance, if the traffic aircraft is predicted to be inside the separation perimeter at their closest point of approach, then the separation perimeter is predicted to be "breached". When computations function 906 reaches such a prediction, this function may be configured to issue avoidance commands. The avoidance commands may preemptively alter the flight path of the aircraft to avoid the risk of a collision. The avoidance commands generated by computations function 906 may be used in altering flight path 307 for first aircraft 302 to altered flight path 314 in FIG. 3.

Computations function 906 uses separation limits 908 to determine the separation perimeter for the aircraft. In other words, separation limits 908 may define the dimensions of the separation perimeter. In one implementation, separation limits 908 may define a minimum separation distance that extends in all directions. In such an implementation, the separation perimeter may be in the form of a sphere. In additional implementations, the separation perimeter may be configured with a plurality of layers based on temporal, aircraft velocity, aircraft motion rate, and distance parameters.

Computations function 906 may be further configured to use response limits 910 in the calculation of avoidance commands. Response limits 910 may determine the promptness at which the avoidance commands are carried out. For example, response limits 910 may be established such that when the predicted closest point of approach between the self-aircraft and a traffic aircraft is predicted to occur at a distance from the self-aircraft's current position that is substantially equal to or greater than some selected threshold, computations function 906 may delay the provision of the one or more avoidance commands. Conversely, if the predicted closest point of approach between the self-aircraft and the traffic vehicle is predicted to occur at a distance from the self-aircraft's current position that is less than the selected threshold, computations function 906 may immediately provide the one or more avoidance commands for execution by the self-aircraft.

In other embodiments, response limits 822 may also include time limitations. For example, if the closest point of approach is likely to occur far in the future, such as beyond a predetermined time interval, computations function 906 may delay avoidance command execution. Conversely, if the closest point of approach is imminent in time, such as before a predetermined time interval elapses, computations function 906 may more rapidly provide the avoidance commands for execution.

In this way, the computations function 906 may initiate avoidance based on the imminence of the potential collision with each of a plurality of traffic aircraft. For example, the implementation of time limitations as response limits 910 by computations function 906 may be suitable for collision avoidance between aircraft with long times-to-go for a closest point of approach. Longer times-to-go for a closest point of approach may be predicted between two aircraft that are flying in formation at close range along parallel paths, trailing one another, or heading on trajectories at a far range from each other with near zero closest point of approach distance.

Avoidance modification function 912 may be configured to assign gain, or avoidance weights, to the one or more avoidance commands generated by computations function 906. The avoidance weights ($K_{p,n}$) may be represented by $K_{avoidance}$ as shown in FIG. 7. Avoidance weights may be used to determine the strength of the avoidance command.

Avoidance modification function 912 may increase the gain in one or more avoidance commands as the closest point of approach between the self-aircraft and a traffic aircraft decreases. For example, a first set of avoidance computations, limits, and gains may enable separation using low-gain avoidance commands when the predicted breach of a separation perimeter layer is far in range. In another example, a second set of avoidance computations, limits, and gains may provide high-gain avoidance commands to overcome the normal control commands issued by vehicle response function 804 in FIG. 8 when the predicted breach of the separation perimeter layer is near.

In this manner, computations function 906 and avoidance modification function 912 may increase the tendency of the self-aircraft to alter its flight path as it closes in on the traffic aircraft. Moreover, it will be appreciated that avoidance modification function 912 may be configured to assign different gains to other generated avoidance commands based on the specific separation perimeter layer being breached.

In these illustrative examples, trajectory modification function 914 includes adjustment algorithms that are configured to modify the flight trajectories generated by trajectory generator function 802. Specifically, trajectory modification function 914 generates changes for the flight trajectory, also referred to as trajectory deltas, based on the weighted and limited avoidance commands from avoidance modification function 912. Trajectory modification function 914 may then integrate the trajectory delta with a generated trajectory to produce a new modified trajectory.

In some illustrative examples, avoidance modification function 912 may output avoidance commands to change heading, heading rate, climb and descend rates, speed, acceleration, and/or deceleration. The avoidance commands are then converted into delta trajectory commands based on the steering law for the aircraft, as well as the desired aircraft response to the steering commands.

For example, the aircraft steering law may be configured to convert heading change into a heading rate command based on a proportional control law with gain K. In such an instance, when a traffic aircraft is predicted to breach a separation perimeter of the self-aircraft, a steering adjustment algorithm of trajectory modification function 914 may produce a heading delta, or change, by dividing a collision avoidance heading rate command by K. In this case, the steering law will convert this result back to a heading rate command.

In another illustrative example, when the pre-determined trajectory generated by trajectory generator function 802 includes a set of waypoints, trajectory modification function 914 may include an adjustment algorithm that moves the next waypoint of the trajectory based on one or more avoidance commands. In this manner, the desired heading change may be produced to provide collision avoidance in the event a separation perimeter is breached.

Subsequent to the trajectory modification, new modified trajectory 916 may be passed on to vehicle response function 804 in FIG. 8 to be implemented. Vehicle response function 804 may include the steering laws and vehicle response. In this manner, collision avoidance module 806 may provide collision avoidance without the need to modify aircraft control commands, as described in FIG. 4. In other words, collision avoidance module 806 may be implemented as a separate function outside of the steering and flight control functions for an aircraft, such as outside trajectory generator function 802 and vehicle response function 804.

It will be appreciated that collision avoidance module 806 may be configured to continuously monitor the trajectories of the self-aircraft and the traffic aircraft and predict future "breaches" of the separation perimeter using the closest point of approach avoidance computations between the aircraft. In response, trajectory modification function 914 may continuously make adjustments to the flight trajectory whenever the "breaches" are predicted to occur to ensure that proper separation between aircraft is maintained.

Figure 10:
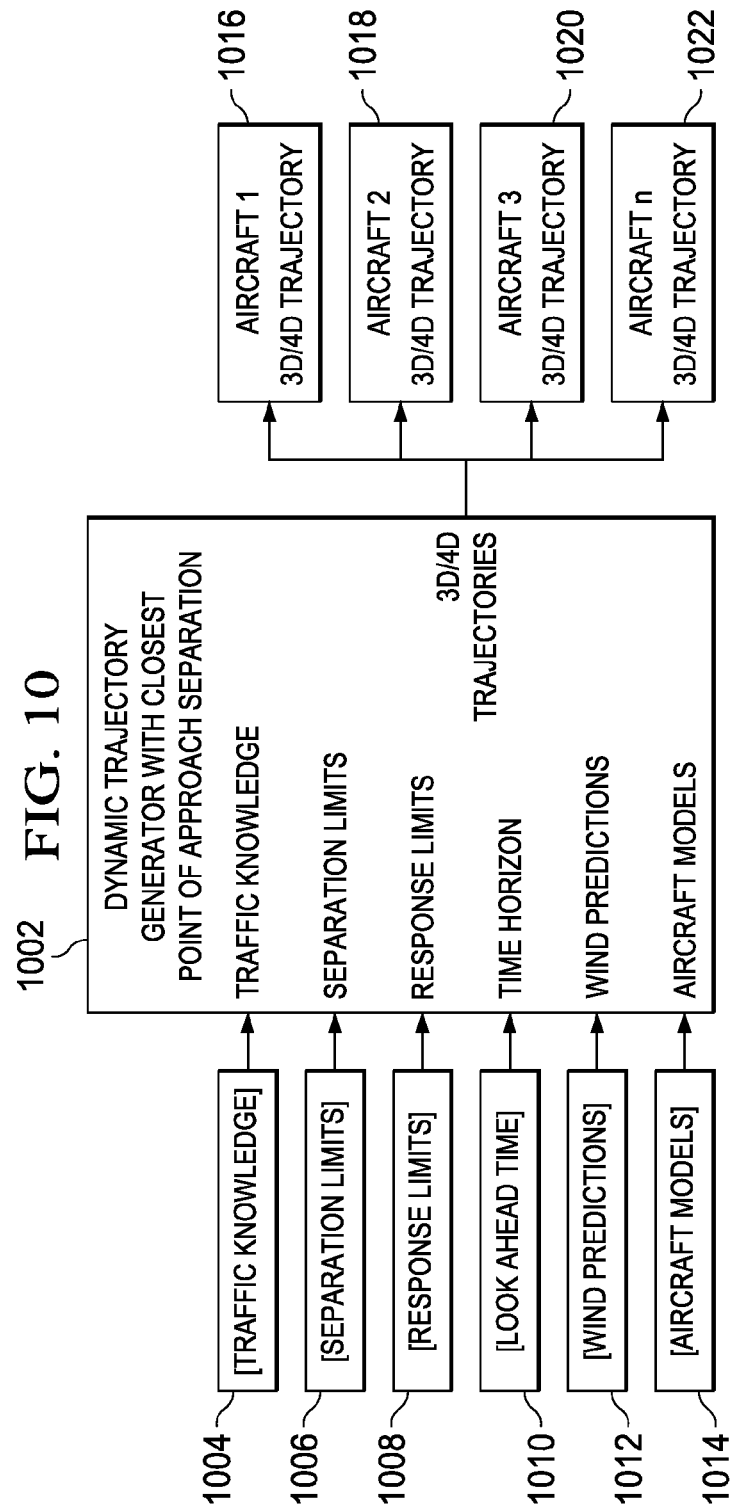
FIG. 10 is an illustration of a dynamic trajectory generator in accordance with an advantageous embodiment.

With reference now to FIG. 10, an illustration of a dynamic trajectory generator is depicted in accordance with an advantageous embodiment. In this illustrative example, dynamic trajectory generator 1002 may be a ground-based trajectory generator configured to provide "deconflicted" flight trajectories for a plurality of aircraft. A deconflicted flight trajectory for an aircraft is a flight trajectory along which no potential breaches of the separation perimeter are predicted to occur. In other words, the aircraft trajectories supplied by dynamic trajectory generator 1002 are configured to maintain desired levels of separation between aircraft at all times.

Specifically, deconflicted trajectories may be generated by running independently optimal but conflicted trajectories through a simulation that contains models of the vehicle dynamics, their respective separation control laws or mechanisms, and wind predictions. The processing of these trajectories by dynamic trajectory generator 1002 provides the deconflicted trajectories.

For example, dynamic trajectory generator 1002 may be configured to receive data that includes traffic knowledge 1004, separation limits 1006, response limits 1008, look ahead time 1010, wind predictions 1012, and aircraft models 1014. In turn, dynamic trajectory generator 1002 may generate a plurality of aircraft flight trajectories based on closest point of approach computations. These flight trajectories may include three-dimensional trajectories, and as well as four-dimensional trajectories that dictate the positions of the aircraft at a particular time.

Traffic knowledge 1004 may include positions and flight trajectories of a plurality of traffic aircraft. In these illustrative examples, traffic knowledge 1004 may include traffic data received from a Traffic Alert and Collision Avoidance System (TCAS), an Automatic Dependent Surveillance (ADS) system, a ground air traffic control (ATC) system, or traffic surveillance sensor systems onboard other aircraft, as well as other air traffic detection systems. In other embodiments, traffic knowledge 1004 may include flight trajectories from flight plans, predicted flight trajectories from current aircraft positions and velocities, and other predetermined flight trajectories.

Separation limits 1006 may define the dimensions of separation perimeters for the plurality of aircraft. In one illustrative example, separation limits 1006 may define a minimum separation distance for each aircraft that extends in all directions. In such an implementation, the separation perimeter may be in the form a sphere.

For example, a separation perimeter may be established based on the separation distance of one mile in all directions. In this example, a traffic aircraft is considered to have "breached" a separation perimeter if the traffic aircraft is closer than one mile at the closest point of approach. In other illustrative examples, separation limits 1006 may be configured to provide other separation perimeter shapes, as well as multiple separation layers, as described above.

Response limits 1008 may determine the promptness at which the avoidance commands are carried out. In some illustrative examples, response limits 1008 may include time limitations for the execution of avoidance commands.

Look ahead time 1010 includes specific time horizons for which dynamic trajectory generator 1002 is to generate the flight trajectories for a plurality of aircraft. Wind predictions 1012 include wind data which may be used by dynamic trajectory generator 1002 to plot the flight trajectories. In some illustrative examples, wind predictions 1012 may be obtained from aviation weather reports such as METAR reports, Terminal Aerodrome Forecasts (TAF) from the National Weather Service (NWS), as well as other meteorological report sources.

Aircraft models 1014 may include aircraft performance data. Such performance data may include aircraft steering laws, aircraft control laws, and performance dynamics and capabilities.

Dynamic trajectory generator 1002 may run simulations using traffic knowledge 1004, separation limits 1006, response limits 1008, look ahead time 1010, wind prediction 1012, and aircraft models 1014 to generate deconflicted flight trajectories for a plurality of aircraft. For instance, the flight trajectories derived from traffic knowledge 1004 may be used by dynamic trajectory generator 1002 to predict whether at their closest point of approach, a plurality of aircraft are expected to "breach" a predetermined separation perimeter as determined by separation limits 1006.

Based on these predictions, dynamic trajectory generator 1002 may change the flight trajectories to generate deconflicted trajectories that prevent these separation perimeter breaches. In various implementations, the simulations may be conducted using the exemplary equations shown in FIG. 7. Moreover, dynamic trajectory generator 1002 may be configured to use response limits 1008 to tailor the trajectory changes. In some implementations, dynamic trajectory generator 1002 may also account for wind predictions 1012. For example, trajectory changes may be modified using wind predictions 1012 to counter and/or nullify the undesired effects of the wind on the flight trajectories. In further embodiments, dynamic trajectory generator 1002 may also take into consideration aircraft models 1014 to design flight trajectories that conform to the performance capabilities of the aircraft.

Once the deconflicted trajectories have been determined for a plurality of aircraft, dynamic trajectory generator 1002 may use aircraft models 1014 to translate the deconflicted trajectories into control commands for implementation within each of the plurality of aircraft. The control commands may include heading rate change commands, climb or descend rate modification commands, acceleration and deceleration commands, and other steering commands such as speed, altitude, and heading alteration commands.

Alternatively, dynamic trajectory generator 1002 may provide the flight trajectories to the aircraft for implementation by an autopilot or flight management system onboard each aircraft. For example, flight trajectories may be provided to aircraft 1016, aircraft 1018, aircraft 1020, and aircraft 1022. It will be appreciated that simulations may be continually run by dynamic trajectory generator 1002 out to a specified time horizon using current aircraft state information and proposed trajectories or intentions.

Figure 11:
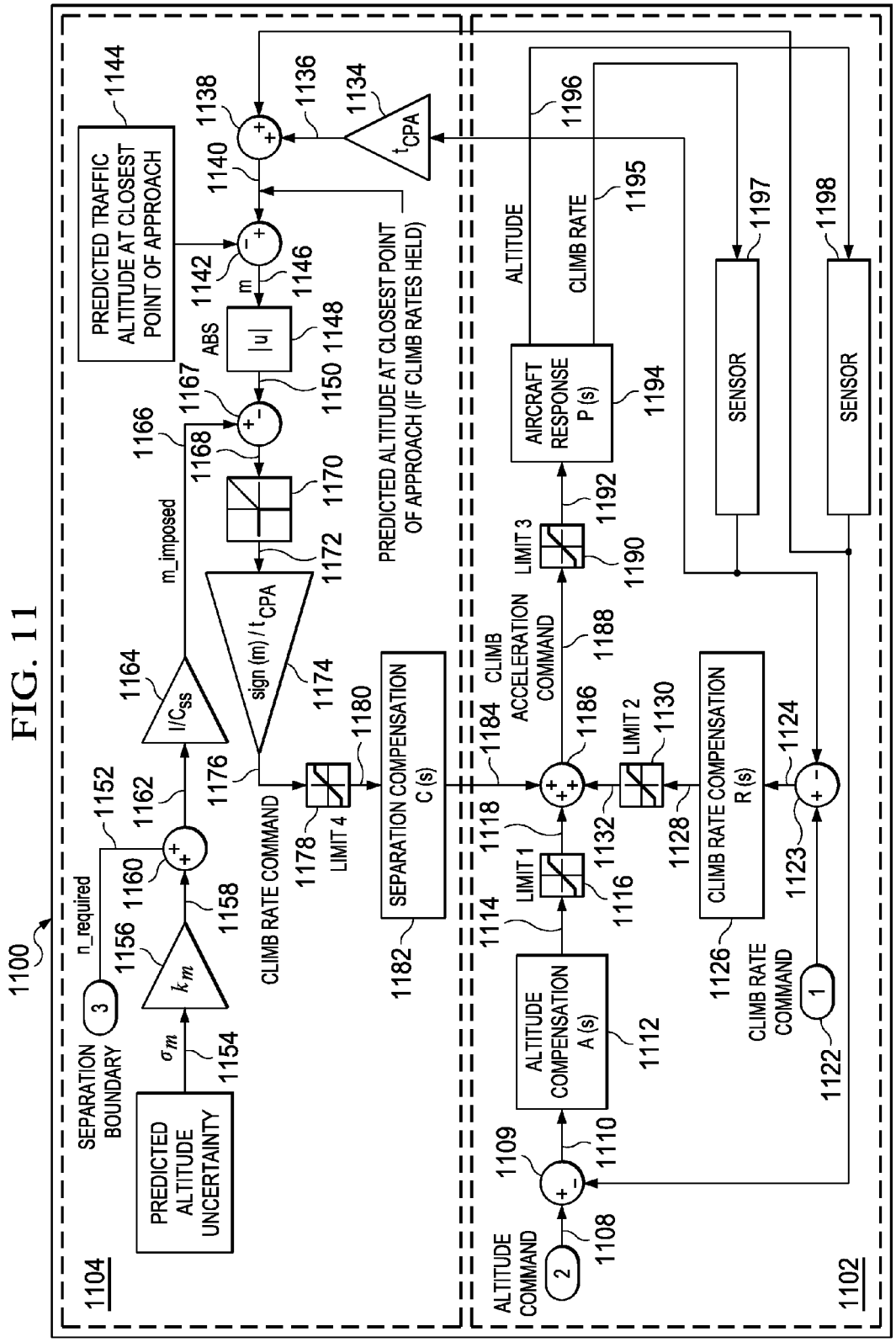
FIG. 11 is an illustration of a system for providing collision avoidance to aircraft in accordance with an advantageous embodiment.

With reference now to FIG. 11, an illustration of a system for providing collision avoidance to aircraft is depicted in accordance with an advantageous embodiment. In this illustrative example, system 1100 includes flight control module 1102 and collision avoidance module 1104. Flight control module 1102 may be implemented using one or more of navigation system 502, autopilot 506, and/or flight director 508 in FIG. 5. Further, collision avoidance module 1104 may be implemented using collision avoidance module 524 in FIG. 5, collision avoidance module 604 in FIG. 6, and/or collision avoidance module 806 in FIG. 8.

In this illustrative example, the control logic depicted in flight control module 1102 and collision avoidance module 1104 is used to generate climb acceleration commands to control the altitude of an aircraft in which system 1100 is implemented.

As depicted, flight control module 1102 subtracts measured altitude 1106 from current altitude command 1108 using subtracter 1109 to generate result 1110. Measured altitude 1106 may be the altitude of the aircraft as detected and/or measured using sensors onboard the aircraft.

Current altitude command 1108 is the altitude for the aircraft that is currently selected by a pilot of the aircraft and/or the autopilot for the aircraft. For example, current altitude command 1108 may be generated by autopilot 506, flight director 508, and/or the pilot of the aircraft in which avionics system 500 is implemented.

Result 1110 is sent into altitude compensation component 1112. Altitude compensation component 1112 is configured to generate climb acceleration command 1114 for the aircraft. In this illustrative example, a climb acceleration command is a command that is sent to the actuators for the flight control surfaces of the aircraft to achieve the desired climb acceleration. Further, in this depicted example, the compensation in altitude compensation component 1112 may be set to a gain, $k_a$.

The desired climb acceleration is the acceleration that causes the aircraft to climb or descend to the altitude indicated by current altitude command 1108. In this manner, climb acceleration command 1114 is configured to cause the aircraft to climb or descend with a desired acceleration to account for the deviation in measured altitude 1106 and current altitude command 1108.

First limit function 1116 is applied to climb acceleration command 1114 to generate first limited acceleration command 1118. First limit function 1116 is configured to limit climb acceleration command 1114. As one illustrative example, first limit function 1116 may be set to reduce and/or prevent the possibility of an undesired ride quality for the passengers during the flight of the aircraft.

In this illustrative example, measured climb rate 1120 is the climb rate for the aircraft as detected and/or measured using sensors onboard the aircraft. Measured climb rate 1120 is subtracted from current climb rate command 1122 using subtracter 1123 to generate result 1124.

Current climb rate command 1122 is the climb rate for the aircraft that is currently selected by a pilot of the aircraft and/or the autopilot for the aircraft. For example, current climb rate command 1122 may be generated by autopilot 506, flight director 508, and/or the pilot of the aircraft in which avionics system 500 is implemented.

As depicted, result 1124 is sent into climb rate compensation component 1126. Climb rate compensation component 1126 is configured to generate climb acceleration command 1128 for the aircraft. In this illustrative example, the compensation in climb rate compensation command 1126 is set to a gain, $k_r$. Climb acceleration command 1128 is configured to cause the aircraft to climb or descend with a desired climb acceleration to account for the difference between measured climb rate 1120 and current climb rate command 1122.

In this illustrative example, second limit function 1130 is applied to climb acceleration command 1128 to generate second limited acceleration command 1132. Second limit function 1130 is configured to limit climb acceleration command 1114.

When measured altitude 1106 and measured climb rate 1120 are considered to have unity response magnitude and with the altitude compensation gain set to $k_a$ and the climb rate compensation gain set to $k_r$, the non-limited response to current altitude command 1108 may be simplified as follows:

$$\frac{\text{Altitude}}{\text{Altitude Command}} = \frac{k_a}{s^2 + k_r s + k_a} \quad (13)$$

where altitude is measured altitude 1106 and altitude command is current altitude command 1108.

In this depicted example, measured climb rate 1120 is also used by altitude climbed component 1134 in collision avoidance module 1104. Altitude climbed component 1134 uses measured climb rate 1120 and a time to closest point of approach between the aircraft and another aircraft identified as a traffic aircraft to generate altitude distance climbed 1136. In this illustrative example, the time to closest point of approach is the period of time between the current time and the time at which the closest point of approach is predicted to occur.

Altitude distance climbed 1136 may be the distance in altitude predicted to be climbed during the period of time between the current time at which measured climb rate 1120 is measured and the time of the closest point of approach. In some illustrative examples, altitude distance climbed 1136 may be a negative value. In these cases, the aircraft is predicted to descend by the magnitude of altitude distance climbed.

Adder 1138 in collision avoidance module 1104 is configured to add altitude distance climbed 1136 to measured altitude 1106 to generate predicted altitude 1140. Predicted altitude 1140 is the altitude predicted for the aircraft at the time of the closest point of approach between the aircraft and the traffic aircraft.

As depicted, subtracter 1142 in collision avoidance module 1104 is configured to subtract predicted traffic altitude 1144 from predicted altitude 1140 to generate miss distance 1146. Predicted traffic altitude 1144 is the predicted altitude for the traffic aircraft. Predicted traffic altitude 1144 may be based on the flight plan obtained for the traffic aircraft, tracking data, sensor data, information received form a traffic collision avoidance system, shared data from the traffic aircraft, and/or other suitable information.

Miss distance 1146 is the distance in altitude between the aircraft and the traffic aircraft predicted at the time of the closest point of approach. When miss distance 1146 is positive in this example, the traffic aircraft may be below the aircraft. When miss distance 1146 is negative, the traffic aircraft may be above the aircraft.

Absolute value component 1148 is configured to generate absolute miss distance 1150 using miss distance 1146. Absolute miss distance 1150 is the absolute value of miss distance 1146 in this illustrative example.

In this illustrative example, collision avoidance module 1104 is configured to determine whether miss distance 1146 provides the desired level of separation. In particular, the desired level of separation is an imposed level of separation, such as imposed level of separation 140 in FIG. 1. In other words, collision avoidance module 1104 determines whether miss distance 1146 is substantially equal to at least the distance that provides the imposed level of separation.

As depicted, collision avoidance module 1104 uses required distance 1152 and uncertainty 1154 to identify the distance for the imposed level of separation. Uncertainty 1154 is an estimate for the uncertainty present in the computation of predicted altitude 1140 for the time of the closest point of approach that is predicted.

Collision avoidance module 1104 applies gain 1156 to uncertainty 1154 to generate result 1158. Result 1158 is added to required distance 1152 using adder 1160 to generate safe distance 1162. Safe distance 1162 is then divided by a steady state response gain in steady state component 1164 to generate imposed distance 1166. Imposed distance 1166 is the distance that defines the boundary for the imposed level of separation that is desired.

In this depicted example, the steady state response gain is defined as follows:

$$C = \frac{K_p s + K_I(1 + bK_p)}{s + bK_I}, \text{ where} \quad (14)$$

$$\lim_{s \to 0}(C) = \frac{1}{b} \to K_p, \text{ and} \quad (15)$$

where C is the steady state response gain, $K_p$ is a proportional gain, $K_I$ is an integral gain, b is an integral leak gain, and s is a complex varaiable.

In this illustrative example, collision avoidance module 1104 subtracts absolute miss distance 1150 from imposed distance 1166 using subtracter 1167 to generate distance result 1168. Collision avoidance module 1104 uses function 1170 to process distance result 1168.

In particular, function 1170 generates recover distance 1172 based on whether distance result 1168 is greater than zero. Recover distance 1172 is the distance still needed to provide the desired level of separation. When distance result 1168 is substantially equal to zero or less than zero, recover distance 1172 may be a zero or null value. In other words, when distance result 1168 is substantially equal to zero or less than zero, the desired level of separation is present.

If distance result 1168 is greater than zero, recover distance 1172 is a positive value equal to the distance needed to recover the desired level of separation. In other words, when distance result 1168 is greater than zero, the desired level of separation is predicted to be absent at the time of the closest point of approach.

In this illustrative example, recover distance 1172 is processed using climb rate command component 1174. Climb rate command component 1174 applies the sign of missed distance 1146 to recover distance 1172 and then divides this value by the time to closest point of approach for the two aircraft to generate climb rate command 1176.

A positive value for climb rate command 1176 indicates that the aircraft needs to climb to have the desired level of separation. A negative value for climb rate command 1176 indicates that the aircraft needs to descent to have the desired level of separation. A zero value for climb rate command 1176 indicates that the desired level of separation is already present.

As depicted, fourth limit function 1178 is applied to climb rate command 1176 to generate limited climb rate command 1180. Fourth limit function 1178 is configured to ensure that the command does not cause the aircraft to climb or descend more quickly than desired.

In one illustrative example, when loss of separation is predicted, fourth limit function 1178 may be set to a value that is greater than first limit function 1116 and/or third limit function 1190 to yield a steady state command for limited climb rate command 1180.

Limited climb rate command 1180 is sent into separation compensation component 1182. Separation compensation component 1182 is configured to generate climb acceleration command 1184 using limited climb rate command 1180. Climb acceleration command 1184 is configured to take into account whether the desired level of separation is predicted to be present at the time of the closest point of approach.

In this depicted example, fourth limit function 1178 may be set such that climb acceleration command 1184 is greater than climb acceleration command 1114. In this manner, the aircraft may be controlled to maneuver away from the current path despite current altitude command 1108.

In this illustrative example, climb acceleration command 1184, climb acceleration command 1114, and climb acceleration command 1128 are added using adder 1186 to generate final climb acceleration command 1188. Third limit function 1190 is applied to final climb acceleration command 1188 to generate limited final climb acceleration command 1192. Third limit function 1190 may be set to a value for the maximum safe performance of the aircraft. In other words, third limit function 1190 may limit limited final climb acceleration command 1192 such that limited final climb acceleration command 1192 does not cause the aircraft to maneuver in an undesired manner.

Limited final climb acceleration command 1192 may be sent to, for example, the autopilot of the aircraft and/or a flight management system of the aircraft. In this manner, limited final climb acceleration command is a final control command for the aircraft. These systems may control the actuators of the flight control surfaces of the aircraft using limited final climb acceleration command 1192.

As depicted, aircraft response component 1194 is the actual response of the aircraft to limited final climb acceleration command 1192. In this control system, the output of aircraft response component 1194 may be actual climb rate 1195 and actual altitude 1196 of the aircraft. Sensor component 1197 may measure the climb rate of the aircraft to generate measured climb rate 1120. Sensor component 1198 may measure the altitude of the aircraft to generate measured altitude 1106.

In this illustrative example, first limit function 1116, second limit function 1130, third limit function 1190, and fourth limit function 1178 may be adjusted to provide the desired value for final climb acceleration command 1188. In particular, these values may be adjusted to place desired limits on the different climb acceleration commands used to form final climb acceleration command 1188.

In this manner, system 1100 provides the aircraft with a capability to alter its flight path when the predicted miss distance at the closest point of approach does not provide the desired level of separation between the aircraft and a traffic aircraft.

Figure 12:
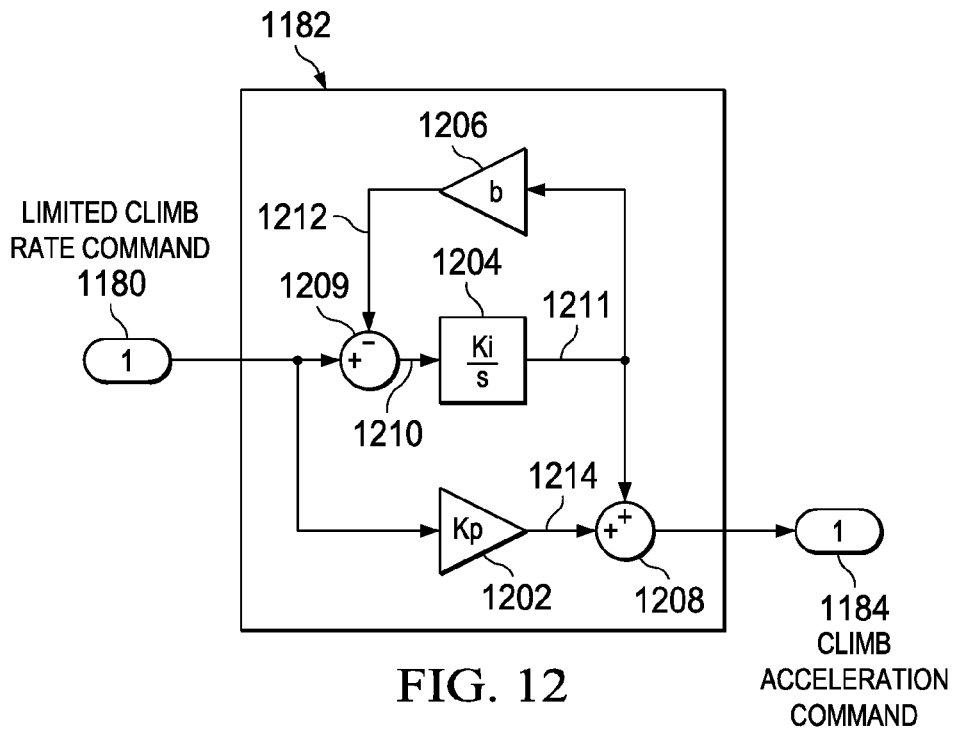
FIG. 12 is an illustration of a separation compensation component in accordance with an advantageous embodiment.

With reference now to FIG. 12, an illustration of a separation compensation component is depicted in accordance with an advantageous embodiment. In this illustrative example, separation compensation component 1182 from FIG. 11 is depicted in greater detail.

As depicted, separation compensation component 1182 includes proportional gain 1202, integral gain component 1204, integral leak gain 1206, and adder 1208. In this illustrative example, the output of integral leak gain 1206 is subtracted from limited climb rate command 1180 from FIG. 11 using subtracter 1209 to generate result 1210. Integral gain component 1204 is applied to result 1210 to generate result 1211. Integral leak gain 1206 is applied to result 1211 to generate output 1212 that is subtracted from limited climb rate command 1180.

Further, proportional gain 1202 is applied to limited climb rate command 1180 to generate result 1214. Result 1211 and result 1214 are added together using adder 1208 to form climb acceleration command 1184, as described in FIG. 11.

With system 1100 from FIG. 11 and separation compensation component 1182 in FIGS. 11 and 12, recover distance 1172 may be integrated with an output rate limited by fourth limit function 1178. Climb acceleration command 1184 may command the aircraft away from the altitude commanded by current altitude command 1108. However, climb acceleration command 1184 may compete with climb acceleration command 1114 and overrides climb acceleration command 1114 when climb acceleration command 1114 reaches the limit specified by first limit function 1116.

Alternatively, the feedback provided by collision avoidance module 1104 may be configured to override climb acceleration command 1114 by setting a gain for climb acceleration command 1114 to zero or limiting climb acceleration command 1114 such that climb acceleration command 1184 generated by collision avoidance module 1104 is allowed to recover the desired level of separation.

In these illustrative examples, the transfer response function of miss distance 1146 to imposed distance 1166 may be given by the following equation:

$$\frac{m}{m_{imposed}} = \frac{C\left(s + \frac{1}{t_{cpa}}\right)}{s^2 + (k_y + C)s + \left(k_a + \frac{C}{t_{cpa}}\right)}. \tag{16}$$

Further, when the altitude compensation is limited, the transfer response function may be:

$$\frac{m}{m_{imposed}} = \frac{C\left(s + \frac{1}{t_{cpa}}\right)}{s^2 + (k_r + C)s + \frac{C}{t_{cpa}}}. \tag{17}$$

When two aircraft are flying in airspace, the time to closest point of approach between the two aircraft may be initially large. As a result, the transfer response function may be approximated by the following equation:

$$\frac{m}{m_{imposed}} = \frac{C}{s + k_r + C} \text{ or} \tag{18}$$

$$\frac{m}{m_{imposed}} = \frac{(K_p s + K_I) + bK_I K_p}{(s^2 + (k_r + K_p)s \to K_I) + bK_I(s + K_p + k_r)} \tag{19}$$

In one illustrative example, integral gain, $K_I$, may be set as follows:

$$K_I = k_r K_p, \text{ which may yield} \tag{20}$$

$$\frac{m}{m_{imposed}} = \frac{K_p(s + k_r(1 + bK_p))}{(s + K_p)(s + k_r) + bk_r K_p(s + K_p + k_r)}. \tag{21}$$

If the integral leak gain, b, is set to zero, then the transfer response function may become:

$$\frac{m}{m_{imposed}} = \frac{K_p}{s + K_p}. \tag{22}$$

Using this relationship, the proportional gain, $K_p$, may be set to establish the time constant of the response in maintaining a desired level of separation. For example, in one illustrative example, the integral leak gain, b, may be set as follows:

$$b = \frac{1}{k_r}. \text{ Then} \tag{23}$$

$$\frac{m}{m_{imposed}} = \frac{K_p(s + k_r + K_p)}{(s + K_p)(s + k_r) + K_p(s + K_p + k_r)}, \tag{24}$$

in which the steady state response gain is as follows:

$$C_{ss} = \lim_{s \to 0}\left(\frac{m}{m_{imposed}}\right) = \frac{1}{1 + \frac{k_r}{K_p + k_r}}. \tag{25}$$

In this illustrative example, the proportional gain, $K_p$, may be represented as a factor of $k_r$. In particular, $$K_p = kk_r, \text{ which yields} \tag{26}$$

$$C_{ss} = \frac{1 + k}{2 + k} \tag{27}$$

where k is a selected gain factor for $k_r$.

In this example, the steady state response gain is less than one. As a result, imposed distance 1166 may be set to a value greater than the magnitude of safe distance 1162 when safe distance 1162 is divided by the steady state response gain using steady state component 1164.

With a larger imposed distance 1166, the aircraft may be prevented from repeatedly cycling between performing an escape maneuver to alter its current flight path and steering back into the current flight back to maintain its desired flight trajectory. In particular, imposed distance 1166 is set such that the steady state condition may remain within this boundary.

In these illustrative examples, increasing the proportional gain, $K_p$, may reduce the steady state error for collision avoidance module 1104 and may increase the responsiveness of the maneuver to reach a desired level of separation being predicted as absent at the time of the closest point of approach.

Additionally, in these illustrative examples, a number of parameters used in collision avoidance module 1104 may be selected such that the response of the aircraft to limited final climb acceleration command 1192 is the desired response. For example, the value of the time to the closest point of approach may be limited such that the resulting gain of climb rate compensation component 1174 is also limited.

As another example, the proportional gain, $K_p$, the integral gain, $K_I$, and the selected gain gactor, k, may be selected such that the aircraft responds to limited final climb acceleration command 1192 in the desired manner. Of course, depending on the implementation, collision avoidance module 1104 may be designed with values and/or limits for any number of the parameters for the different components within collision avoidance module 1104 such that the aircraft maneuvers as desired.

The illustration of system 1100 in FIG. 11 and separation compensation component 1182 in FIG. 12 are not meant to imply physical or architectural limitations to the manner in which an advantageous embodiment may be implemented. Other components in addition to and/or in place of the ones illustrated may be used. Some components may be unnecessary. Further, although system 1100 has been shown for altitude, compensation in other directions may be implemented in a similar manner.

Figure 13:
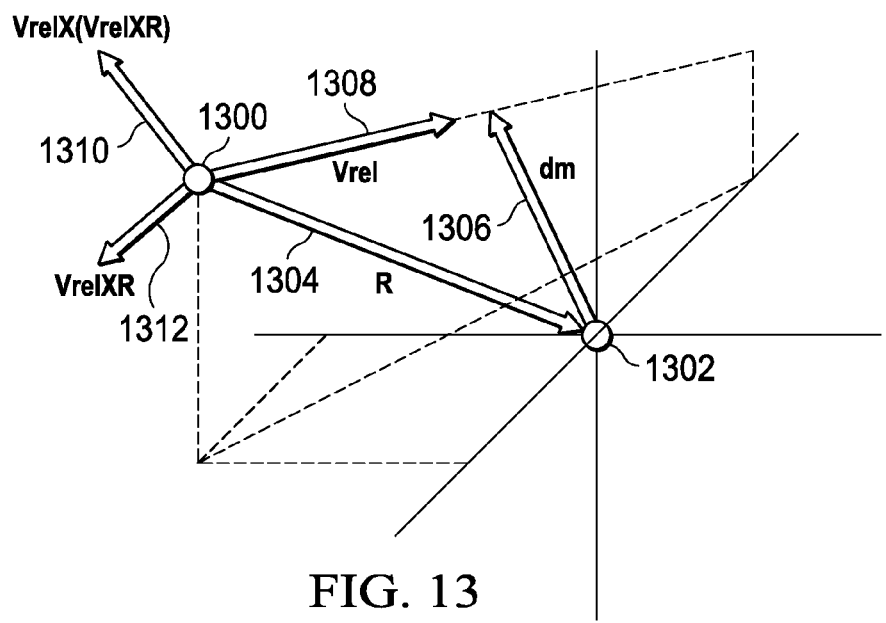
FIG. 13 is an illustration of an encounter between two aircraft in accordance with an advantageous embodiment.

With reference now to FIG. 13, an illustration of an encounter between two aircraft is depicted in accordance with an advantageous embodiment. In this illustrative example, aircraft 1300 and traffic aircraft 1302 are flying in airspace.

As depicted, the magnitude of range vector 1304, R, indicates the current distance between aircraft 1300 and traffic aircraft 1302. The magnitude of miss distance vector 1306 is the miss distance at the closest point of approach predicted for aircraft 1300 and traffic aircraft 1302. In other words, the magnitude of miss distance vector 1306 is the distance predicted between aircraft 1300 and traffic aircraft 1302 at the closest point of approach. Further, the magnitude of relative velocity vector 1308, Vrel, is the speed of aircraft 1300 relative to traffic aircraft 1302.

In this illustrative example, the direction of relative velocity vector 1308 may be changed to increase the miss distance. For example, aircraft 1300 may maneuver in some combination of the direction of vector 1310, and the direction of vector 1312, (Vrel×R). These two vectors, vector 1310 and vector 1312, are orthogonal vectors in this example. Vector 1312 is the cross product vector of relative velocity vector 1308 and range vector 1304, or Vrel×R. Vector 1310 is the cross product vector of relative velocity vector 1308 and vector 1312, or Vrel×Vrel×R.

The direction of vector 1310 may be substantially the same as the direction of miss distance vector 1306. Altering the flight path of aircraft 1300 to provide the desired level of separation by changing the relative velocity of aircraft 1300 in the direction of vector 1310 may require a smaller change in velocity than changing the relative velocity of aircraft 1300 in the direction of vector 1312.

Further, changing the direction of the relative velocity of aircraft 1300 in the direction of vector 1312 may cause the relative motion of aircraft 1300 to move in a spiral manner around the traffic aircraft 1302 in an undesired manner. In some illustrative examples, the direction of vector 1310 may be in a constrained direction when flying. In these cases, the aircraft may maneuver in the direction of vector 1312 until the constraint has been relieved.

Of course, other factors may be taken into account when selecting a direction for an aircraft maneuver. For example, an aircraft may be capable of changing velocity more quickly in a certain direction as compared to other directions. For example, an aircraft may be more efficiently capable of descending as compared to turning.

Figure 14:
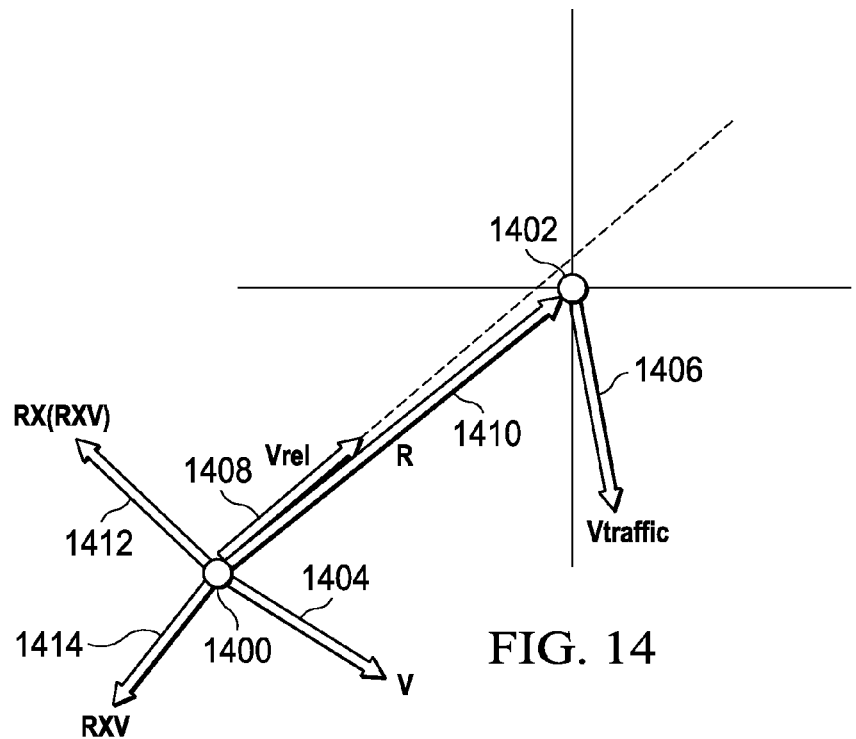
FIG. 14 is an illustration of another encounter between two aircraft in accordance with an advantageous embodiment.

With reference now to FIG. 14, an illustration of another encounter between two aircraft is depicted in accordance with an advantageous embodiment. In this illustrative example, the encounter between aircraft 1400 and traffic aircraft 1402 is a zero miss distance encounter. In other words, the distance predicted between aircraft 1400 and traffic aircraft 1402 at the time to closest point of approach may be substantially zero.

As depicted, aircraft 1400 has velocity vector 1404, V. Traffic aircraft 1402 has velocity vector 1406, $V_{traffic}$. Further, the magnitude of relative velocity vector 1408 is the relative speed of aircraft 1400 relative to traffic aircraft 1402. The magnitude of range vector 1410, R, is the current distance between aircraft 1400 and traffic aircraft 1402.

In this illustrative example, when relative velocity vector 1408 is near zero or when relative velocity vector 1408 and range vector 1410 are substantially aligned or nearly aligned, the cross product vector of relative velocity vector 1408 and range vector 1410, Vrel×R, and the cross product vector of the relative velocity vector 1408 and the cross product vector of relative velocity vector 1408 and range vector 1410, Vrel×(Vrel×R), may be substantially at zero or near zero. If Vrel×R is substantially near zero, velocity vector 1404 of aircraft 1400 may be used instead of relative velocity vector 1408 until the Vrel×R is no longer near zero.

To provide the desired level of separation, aircraft 1400 may change its flight path by moving in a direction that is a combination of the direction for vector 1412, and the direction for vector 1414. Vector 1414 is the cross product vector of range vector 1410 and velocity vector 1404, or R×V. Vector 1412 is the cross product of range vector 1410 and vector 1414, or R×(R×V). In this illustrative example, the preferred direction may be the direction for vector 1412.

Figure 15:
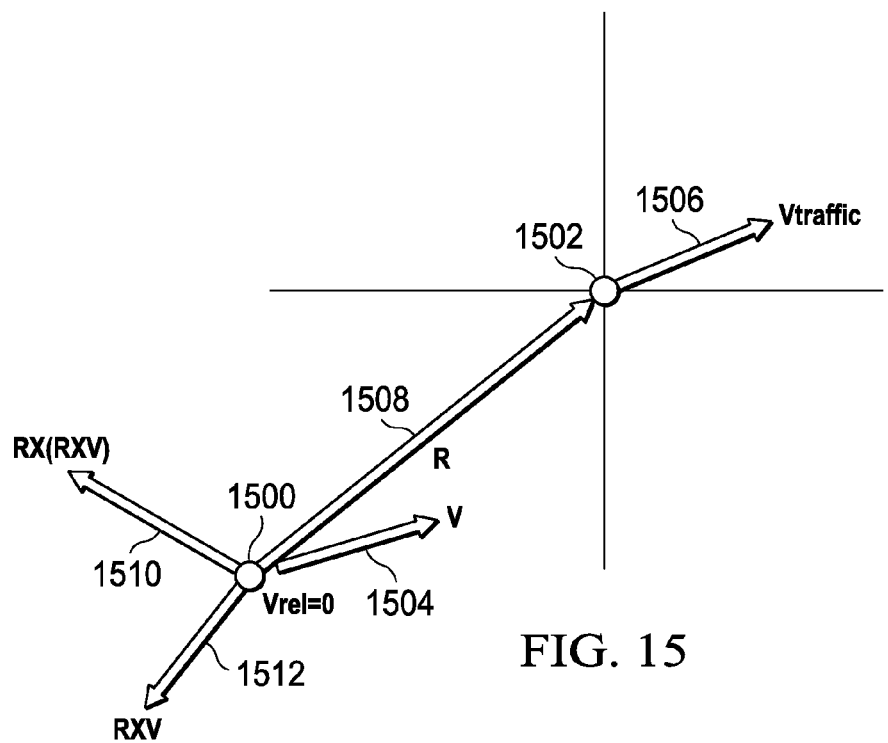
FIG. 15 is an illustration of an encounter between two aircraft in accordance with an advantageous embodiment.

With reference now to FIG. 15, an illustration of an encounter between two aircraft is depicted in accordance with an advantageous embodiment. In this illustrative example, the encounter between aircraft 1500 and aircraft 1502 is a zero relative speed encounter. In other words, the relative speed between aircraft 1500 and aircraft 1502 is substantially zero.

For example, aircraft 1500 and aircraft 1500 may be traveling along substantially parallel flight paths. As depicted, aircraft 1500 has velocity vector 1504, V, and aircraft 1502 has velocity vector 1506, $V_{traffic}$.

In this example, velocity vector 1504 and velocity vector 1506 have substantially the same magnitude and substantially the same direction. In other words, the relative velocity for aircraft 1500 with respect to aircraft 1502 is substantially zero in this illustrative example. As depicted, the magnitude of range vector 1508, R, is the current distance between aircraft 1500 and aircraft 1502.

To provide the desired level of separation, aircraft 1500 may change its flight path by moving in a direction that is a combination of the direction for vector 1510, R×(R×V), and the direction for vector 1512, R×V. In this illustrative example, the preferred direction may be the direction for vector 1510. Vector 1512 is the cross product vector of range vector 1508 and velocity vector 1504, or R×V. Vector 1510 is the cross product of range vector 1508 and vector 1512, or R×(R×V).

In some cases, the preferred direction may be the sign of the dot product of range vector 1508 and velocity vector 1504 for aircraft 1500 multiplied by velocity vector 1504. In this manner, aircraft 1500 may pass traffic aircraft 1502 or go behind traffic aircraft 1502.

Figure 16:
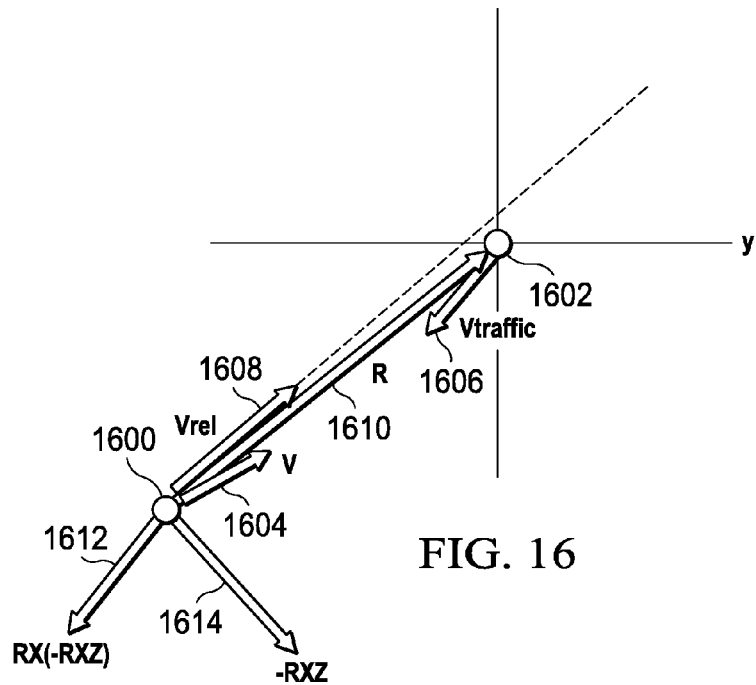
FIG. 16 is an illustration of an encounter between two aircraft in accordance with an advantageous embodiment.

With reference now to FIG. 16, an illustration of an encounter between two aircraft is depicted in accordance with an advantageous embodiment. In this illustrative example, the encounter between aircraft 1600 and aircraft 1602 may be a head on or overtake encounter. In other words, aircraft 1600 and aircraft 1602 may be flying towards each other.

In this illustrative example, aircraft 1600 has velocity vector 1604, V, and aircraft 1602 has velocity vector 1606, $V_{traffic}$. The magnitude of relative velocity vector 1608 is the relative speed of aircraft 1600 with respect to aircraft 1602. The magnitude of range vector 1610, R, is the current distance between aircraft 1600 and aircraft 1602.

With this type of encounter, both the cross product of relative velocity vector 1608 and range vector 1610, or Vrel× R, and the cross product of range vector 1610 and velocity vector 1604, or R×V, are substantially zero. As a result, the directions of vector 1612, R×(−R×Z), and vector 1614, R×Z, may be used to perform maneuvers to provide a desired level of separation. Vector 1614 is the negative cross product of range vector 1610 and the Z direction. Vector 1612 is the cross product of range vector 1610 and vector 1614.

Figure 17:
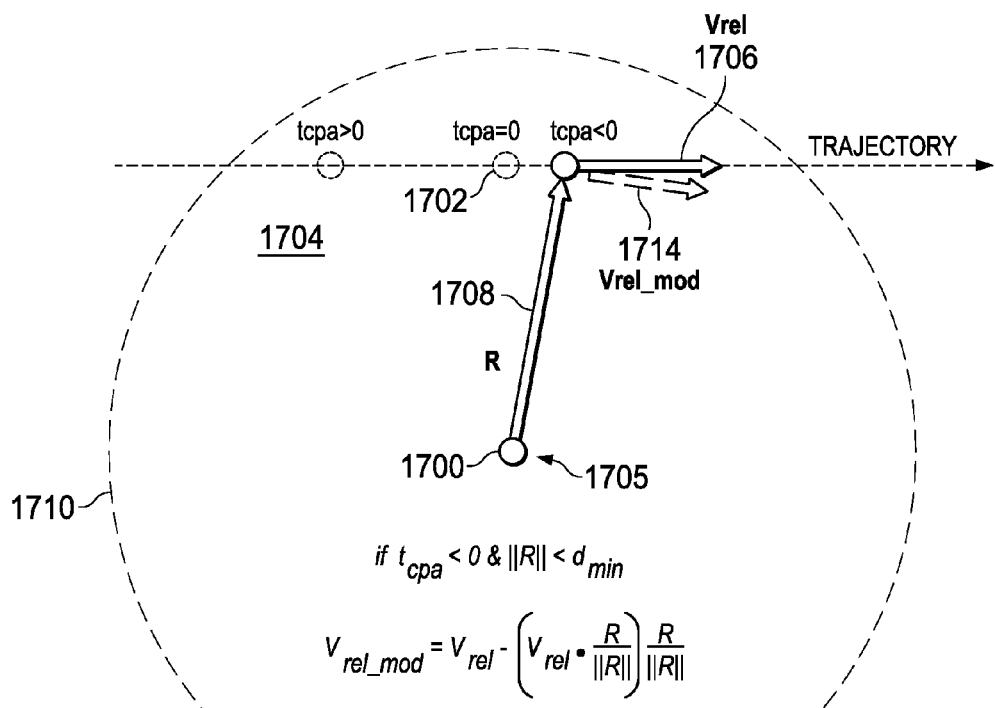
FIG. 17 is an illustration of two aircraft flying in airspace in accordance with an advantageous embodiment.

With reference now to FIG. 17, an illustration of two aircraft flying in airspace is depicted in accordance with an advantageous embodiment. In this illustrative example, aircraft 1700 and aircraft 1702 are flying in airspace 1704. The magnitude of relative velocity vector 1706 is the relative speed of aircraft 1700 relative to aircraft 1702. The magnitude of range vector 1708 is the current distance between aircraft 1700 and aircraft 1702.

In this illustrative example, separation perimeter 1710 has been defined for aircraft 1700. Aircraft 1700 is currently at position 1705 within separation perimeter 1710. Typically, when, the time to the closest point of approach between aircraft 1700 and aircraft 1702 is negative, indicating that the two aircraft are moving away from each other, the avoidance commands generated to maneuver the aircraft may be zero commands.

However, when aircraft 1702 is within separation perimeter 1710, it may be desirable to maneuver further away from aircraft 1700. In particular, aircraft 1702 may use modified relative velocity 1714 vector to compute time to the closest point of approach and other parameters that may be used in generating the collision avoidance commands. Modified relative velocity vector 1714 is selected to keep the time to closest point of approach positive or zero. In other words, modified relative velocity vector 1714 is selected to keep the time to the closest point of approach non-negative. In particular, $$\text{if } t_{cpa} < 0 \ \& \ \|R\| < d_{min}, \text{ then} \tag{28}$$

$$V_{rel\_mod} = V_{rel} - \left(V_{rel} \cdot \frac{R}{\|R\|}\right) \frac{R}{\|R\|}, \tag{29}$$

where $d_{min}$ is a minimum distance for a desired level of separation between aircraft 1700 and aircraft 1702, $V_{rel}$ is relative velocity vector 1706, R is range vector 1708, and $V_{rel\_mod}$ is modified relative velocity vector 1714. In this illustrative example, the minimum distance, $d_m$, defines separation perimeter 1710.

Figure 18:
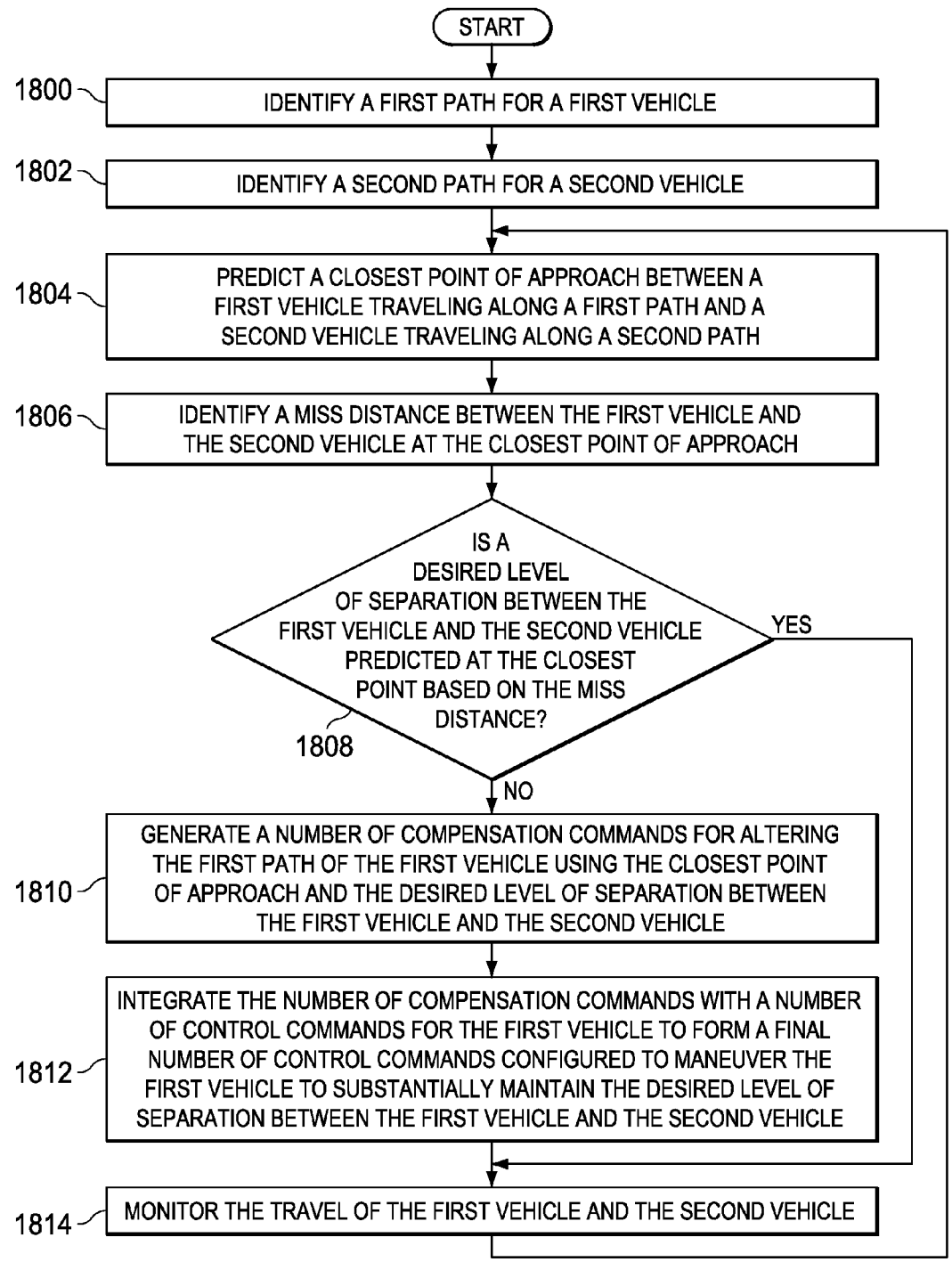
FIG. 18 is an illustration of a flowchart of a process for managing vehicles in accordance with an advantageous embodiment.

With reference now to FIG. 18, an illustration of a flowchart of a process for managing vehicles is depicted in accordance with an advantageous embodiment. The process illustrated in FIG. 18 may be implemented using separation management module 112 in FIG. 1.

The process begins by identifying a first path for a first vehicle (operation 1800). The process then identifies a second path for a second vehicle (operation 1802). The first path includes a velocity for the first vehicle. The second path includes a velocity for the second vehicle.

The process then predicts a closest point of approach between a first vehicle traveling along a first path and a second vehicle traveling along a second path (operation 1804). The closes point of approach between the first vehicle and the second vehicle is predicted to occur when a distance between the first vehicle and the second vehicle has a minimum value if first vehicle continues traveling along the first pat and the second vehicle continues traveling along the second path.

Thereafter, the process identifies a miss distance between the first vehicle and the second vehicle at the closest point of approach (operation 1806). The process then determines whether a desired level of separation between the first vehicle and the second vehicle is predicted at the closest point of approach based on the miss distance (operation 1808). The desired level of separation may be selected from one of a required level of separation, a safe level of separation, and an imposed level of separation.

If the desired level of separation is not predicted at the closest point of approach, the process then generates a number of compensation commands for altering the first path of the first vehicle using the closest point of approach and the desired level of separation between the first vehicle and the second vehicle (operation 1810). Thereafter, the process integrates the number of compensation commands with a number of control commands for the first vehicle to form a final number of control commands configured to maneuver the first vehicle to substantially maintain the desired level of separation between the first vehicle and the second vehicle (operation 1812). Further, the final number of control commands is configured such that the response of the first vehicle to the final number of control commands is a desired response.

The process monitors the travel of the first vehicle and the second vehicle (operation 1814), with the process then returning to operation 1804 as described above. With reference again to operation 1808, if a desired level of separation is predicted at the closest point, the process proceeds to operation 1814.

The flowcharts and block diagrams in the different depicted embodiments illustrate the architecture, functionality, and operation of some possible implementations of apparatus and methods in an advantageous embodiment. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Figure 19:
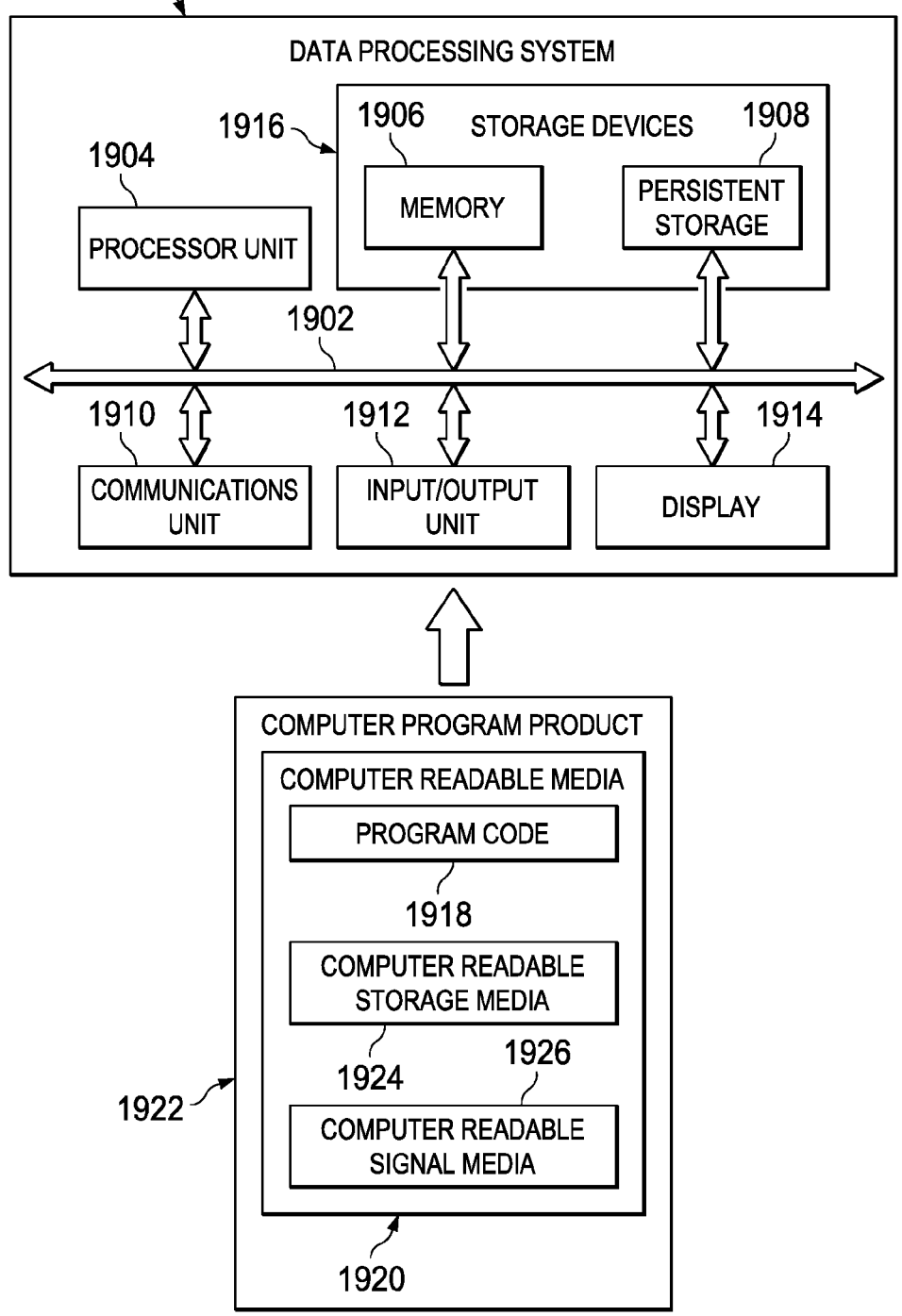
FIG. 19 is an illustration of a data processing system in accordance with an advantageous embodiment.

Turning now to FIG. 19, an illustration of a data processing system is depicted in accordance with an advantageous embodiment. In this illustrative example, data processing system 1900 may be used to implement one or more of number of computers 110 in computer system 108 in FIG. 1. Further, data processing system 1900 may be used to implement one or more of autopilot 506, flight director 508, collision avoidance computer 512, and/or processors 514 in FIG. 5.

As depicted, data processing system 1900 includes communications fabric 1902. Communications fabric 1902 provides communications between processor unit 1904, memory 1906, persistent storage 1908, communications unit 1910, input/output (I/O) unit 1912, and display 1914 in data processing system 1900.

Processor unit 1904 serves to execute instructions for software that may be loaded into memory 1906. Processor unit 1904 may be a number of processors, a multi-processor core, or some other type of processor, depending on the particular implementation. A number, as used herein with reference to an item, means one or more items. Further, processor unit 1904 may be implemented using a number of heterogeneous processor systems in which a main processor is present with secondary processors on a single chip. As another illustrative example, processor unit 1904 may be a symmetric multi-processor system containing multiple processors of the same type.

Memory 1906 and persistent storage 1908 are examples of storage devices 1916. A storage device is any piece of hardware that is capable of storing information, such as, for example, without limitation, data, program code in functional form, and/or other suitable information either on a temporary basis and/or a permanent basis. Storage devices 1916 may also be referred to as computer readable storage devices in these examples. Memory 1906, in these examples, may be, for example, a random access memory or any other suitable volatile or non-volatile storage device. Persistent storage 1908 may take various forms, depending on the particular implementation.

For example, persistent storage 1908 may contain one or more components or devices. For example, persistent storage 1908 may be a hard drive, a flash memory, a rewritable optical disk, a rewritable magnetic tape, or some combination of the above. The media used by persistent storage 1908 also may be removable. For example, a removable hard drive may be used for persistent storage 1908.

Communications unit 1910, in these examples, provides for communications with other data processing systems or devices. In these examples, communications unit 1910 is a network interface card. Communications unit 1910 may provide communications through the use of either or both physical and wireless communications links.

Input/output unit 1912 allows for input and output of data with other devices that may be connected to data processing system 1900. For example, input/output unit 1912 may provide a connection for user input through a keyboard, a mouse, and/or some other suitable input device. Further, input/output unit 1912 may send output to a printer. Display 1914 provides a mechanism to display information to a user.

Instructions for the operating system, applications, and/or programs may be located in storage devices 1916, which are in communication with processor unit 1904 through communications fabric 1902. In these illustrative examples, the instructions are in a functional form on persistent storage 1908. These instructions may be loaded into memory 1906 for execution by processor unit 1904. The processes of the different embodiments may be performed by processor unit 1904 using computer implemented instructions, which may be located in a memory, such as memory 1906.

These instructions are referred to as program code, computer usable program code, or computer readable program code that may be read and executed by a processor in processor unit 1904. The program code in the different embodiments may be embodied on different physical or computer readable storage media, such as memory 1906 or persistent storage 1908.

Program code 1918 is located in a functional form on computer readable media 1920 that is selectively removable and may be loaded onto or transferred to data processing system 1900 for execution by processor unit 1904. Program code 1918 and computer readable media 1920 form computer program product 1922 in these examples. In one example, computer readable media 1920 may be computer readable storage media 1924 or computer readable signal media 1926. Computer readable storage media 1924 may include, for example, an optical or magnetic disk that is inserted or placed into a drive or other device that is part of persistent storage 1908 for transfer onto a storage device, such as a hard drive, that is part of persistent storage 1908. Computer readable storage media 1924 also may take the form of a persistent storage, such as a hard drive, a thumb drive, or a flash memory, that is connected to data processing system 1900. In some instances, computer readable storage media 1924 may not be removable from data processing system 1900. In these examples, computer readable storage media 1924 is a physical or tangible storage device used to store program code 1918 rather than a medium that propagates or transmits program code 1918. Computer readable storage media 1924 is also referred to as a computer readable tangible storage device or a computer readable physical storage device. In other words, computer readable storage media 1924 is a media that can be touched by a person.

Alternatively, program code 1918 may be transferred to data processing system 1900 using computer readable signal media 1926. Computer readable signal media 1926 may be, for example, a propagated data signal containing program code 1918. For example, computer readable signal media 1926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1918 may be downloaded over a network to persistent storage 1908 from another device or data processing system through computer readable signal media 1926 for use within data processing system 1900. For instance, program code stored in a computer readable storage medium in a server data processing system may be downloaded over a network from the server to data processing system 1900. The data processing system providing program code 1918 may be a server computer, a client computer, or some other device capable of storing and transmitting program code 1918.

The different components illustrated for data processing system 1900 are not meant to provide architectural limitations to the manner in which different embodiments may be implemented. The different advantageous embodiments may be implemented in a data processing system including components in addition to or in place of those illustrated for data processing system 1900. Other components shown in FIG. 19 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1904 may take the form of a hardware unit that has circuits that are manufactured or configured for a particular use. This type of hardware may perform operations without needing program code to be loaded into a memory from a storage device to be configured to perform the operations.

For example, when processor unit 1904 takes the form of a hardware unit, processor unit 1904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 1918 may be omitted because the processes for the different embodiments are implemented in a hardware unit.

In still another illustrative example, processor unit 1904 may be implemented using a combination of processors found in computers and hardware units. Processor unit 1904 may have a number of hardware units and a number of processors are configured to run program code 1918. With this depicted example, some of the processes may be implemented in the number of hardware units, while other processes may be implemented in the number of processors.

In another example, a bus system may be used to implement communications fabric 1902 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 1906, or a cache, such as found in an interface and memory controller hub that may be present in communications fabric 1902.

Figure 20:
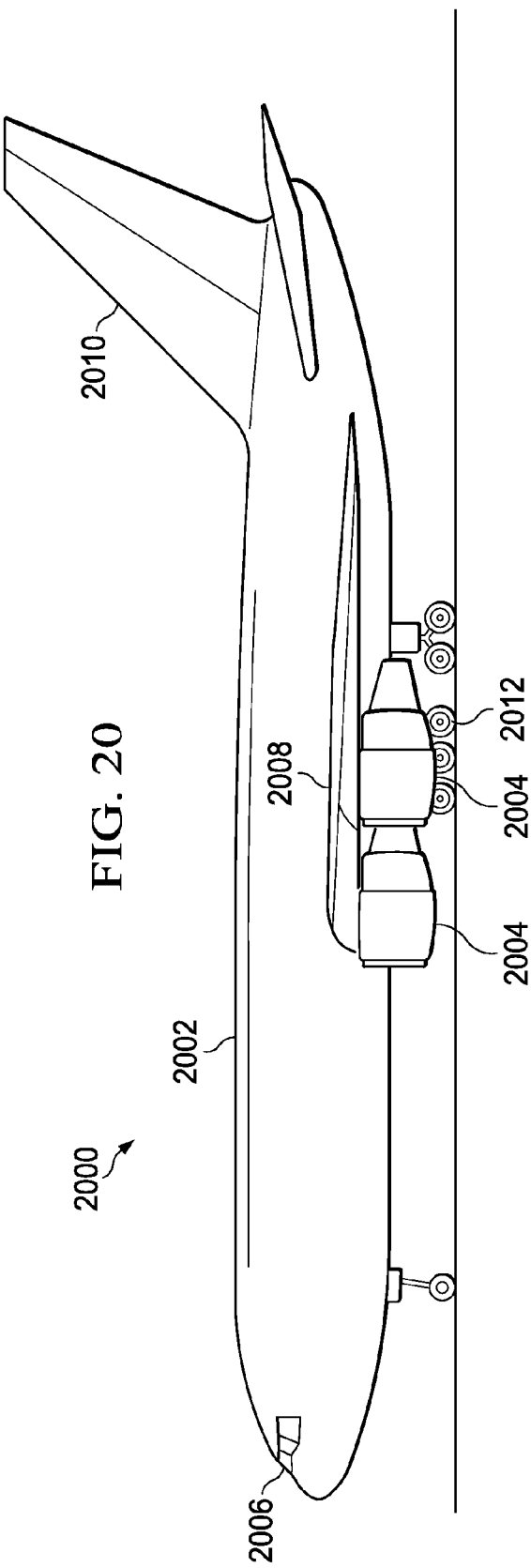
FIG. 20 is an illustration of a side elevation view of an aircraft in accordance with an advantageous embodiment.

With reference now to FIG. 20, an illustration of a side elevation view of an aircraft is depicted in accordance with an advantageous embodiment. In this illustrative example, aircraft 2000 is an example of one implementation for first aircraft 104 in FIG. 1, second aircraft 105 in FIG. 1, first aircraft 302 in FIG. 3, second aircraft 304 in FIG. 3, first aircraft 402 in FIG. 4, and/or second aircraft 404 in FIG. 4.

As depicted, aircraft 2000 includes one or more propulsion units 2004 coupled to fuselage 2002, cockpit 2006 in fuselage 2002, wing assemblies 2008, tail assembly 2010, landing assembly 2012, a control system (not shown), and other suitable types of systems that enable proper operation of aircraft 2000. At least one component of a vehicle-centric collision avoidance system may be located within fuselage 2002. However, components of the collision avoidance system may be distributed throughout the various portions of aircraft 2000.

Thus, the different advantageous embodiments provide a method and apparatus for managing separation between vehicles. In one advantageous embodiment, a method for managing separation between vehicles is provided. A closest point of approach between a first vehicle traveling along a first path and a second vehicle traveling along a second path is predicted. A number of compensation commands for altering the first path of the first vehicle are generated using the closest point of approach and a desired level of separation between the first vehicle and the second vehicle. The number of compensation commands is integrated with a number of control commands for the first vehicle to form a final number of control commands configured to maneuver the first vehicle to substantially maintain the desired level of separation between the first vehicle and the second vehicle. A response of the first vehicle to the final number of control commands is a desired response.

Embodiments of systems and methods in accordance with the present disclosure may provide significant advantages over the prior art. The vehicle-centric collision avoidance systems in accordance with the various embodiments may advantageously alter the flight paths of one or more aircraft based when their predicted closest point of approach (CPA) is expected to breach a predefined separation perimeter. In this way, collision avoidance may be performed without human intervention. Automated collision avoidance may reduce or eliminate the possibility of human error or improperly performed collision avoidance maneuvers. Moreover, the vehicle-centric collision avoidance systems in accordance with the various embodiments may diminish the need for ground air traffic controllers to direct aircraft separation. Such labor savings may make it possible for the air traffic controller to manage a larger number of aircraft than previously possible. Lastly, the vehicle-centric collision avoidance system may also be implemented on unmanned aircraft to enable better control and performance.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing separation between vehicles, the method comprising:
   a computer predicting a closest point of approach between a first vehicle traveling along a first path and a second vehicle traveling along a second path, a predicted closest point of approach being formed;
   the computer generating a number of compensation commands for altering the first path of the first vehicle using the closest point of approach and a predetermined level of separation between the first vehicle and the second vehicle, the predetermined level of separation comprising a three-dimensional separation perimeter layer, each dimension in the three-dimensional separation perimeter layer corresponding to a respective control direction having a respective avoidance gain; and the computer integrating the number of compensation commands with a number of control commands for the first vehicle to form a final number of control commands configured to maneuver the first vehicle to maintain the predetermined level of separation between the first vehicle and the second vehicle, the number of control commands having a magnitude that includes a respective gain contribution from the respective avoidance gain of the respective control dimension when the predicted closest point of approach breaches the three-dimensional separation perimeter layer.

2. The method of claim 1 further comprising:
the computer predicting a time to the closest point of approach, wherein the closest point of approach is predicted to occur when a distance between the first vehicle and the second vehicle has a minimum value if the first vehicle continues traveling along the first path and the second vehicle continues traveling along the second path.

3. The method of claim 2, wherein the step of predicting the closest point of approach comprises:
the computer predicting the distance between the first vehicle and the second vehicle when the distance has the minimum value if the first vehicle continues traveling along the first path and the second vehicle continues traveling along the second path; and
the computer predicting a direction of the second vehicle with respect to the first vehicle when the distance has the minimum value.

4. The method of claim 2, wherein the step of generating the number of compensation commands comprises:
the computer generating the number of compensation commands for altering the first path of the first vehicle using the closest point of approach, the predetermined level of separation between the first vehicle and the second vehicle, and the time to the closest point of approach.

5. The method of claim 1, wherein the first vehicle is a first aircraft and the second vehicle is a second aircraft and wherein the number of control commands is generated using a flight control module in the first aircraft and further comprising:
the computer applying a first set of limit functions to the number of control commands; and
the computer applying a second set of limit functions to the number of compensation commands, wherein the first set of limit functions and the second set of limit functions are configured to reduce a possibility of the first aircraft flying in a manner inconsistent with at least one of safety, passenger comfort, and economy in fuel usage.

6. The method of claim 1 further comprising:
the computer selecting a number of parameters for generating the number of compensation commands.

7. The method of claim 1, wherein the predetermined level of separation is selected from one of a required level of separation, a safe level of separation, and an imposed level of separation.

8. The method of claim 1, wherein the first vehicle is a first aircraft, the second vehicle is a second aircraft, the first path is a first flight path, and the second path is a second flight path and further comprising:
the computer maneuvering the first aircraft to alter the first flight path of the first aircraft to form an altered flight path for the first aircraft in response to the final number of control commands, wherein the altered flight path provides the predetermined level of separation at the closest point of approach between the first aircraft and the second aircraft.

9. The method of claim 8, wherein the maneuvering step comprises:
the computer changing at least one of a speed, an acceleration, and a direction of travel for the first aircraft to form the altered flight path in response to the final number of control commands, wherein the altered flight path provides the predetermined level of separation at the closest point of approach between the first aircraft and the second aircraft.

10. The method of claim 1, wherein the response of the first vehicle to the final number of control command further comprises at least one of a predetermined ride quality, a predetermined-range of acceleration, a predetermined response time, and a predetermined turning rate.

11. The method of claim 1, wherein the step of generating the number of compensation commands comprises:
the computer identifying the predetermined level of separation between the first vehicle and the second vehicle using an uncertainty in a prediction of the closest point of approach.

12. The method claim 1, wherein the first vehicle and the second vehicle are selected from at least one of an unmanned aerial vehicle, a helicopter, a submarine, a surface ship, a missile, a spacecraft, and a ground vehicle.

13. A system comprising:
a separation management module configured to:
predict a closest point of approach between a first vehicle traveling along a first path and a second vehicle traveling along a second path using the first path and the second path, a predicted closest point of approach being formed;
generate a number of compensation commands for altering the first path of the first vehicle using the closest point of approach and a predetermined level of separation between the first vehicle and the second vehicle, the predetermined level of separation comprising a three-dimensional separation perimeter layer, each dimension in the three-dimensional separation perimeter layer corresponding to a respective control direction having a respective avoidance gain; and
integrate the number of compensation commands with a number of control commands for the first vehicle to form a final number of control commands configured to maneuver the first vehicle to maintain the predetermined level of separation between the first vehicle and the second vehicle, the number of control commands having a magnitude that includes a respective gain contribution from the respective avoidance gain of the respective control dimension when the predicted closest point of approach breaches the three-dimensional separation perimeter layer.

14. The system of claim 13, wherein the separation management module is further configured to predict a time to the closest point of approach, wherein the closest point of approach is predicted to occur when a distance between the first vehicle and the second vehicle has a minimum value if the first vehicle continues traveling along the first path and the second vehicle continues traveling along the second path.

15. The system of claim 14, wherein in being configured to predict the closest point of approach, the separation management module is configured to predict the distance between the first vehicle and the second vehicle when the distance has the minimum value while the first vehicle travels along the first path and the second vehicle travels along the second path;

and predict a direction of the second vehicle with respect to the first vehicle when the distance has the minimum value.

16. The system of claim 14, wherein in being configured to generate the number of compensation commands, the separation management module is configured to generate the number of compensation commands for altering the first path of the first vehicle using the closest point of approach, the predetermined level of separation between the first vehicle and the second vehicle, and the time to the closest point of approach.

17. The system of claim 13, wherein the first vehicle is a first aircraft and the second vehicle is a second aircraft and further comprising:

a flight control module in communication with the separation management module, wherein the flight control module is configured to generate the number of control commands and apply a first set of limit functions to the number of control commands and the separation management module is configured to apply a second set of limit functions to the number of compensation commands, wherein the first set of limit functions and the second set of limit functions are configured to reduce a possibility of the first aircraft flying in a manner inconsistent with at least one of safety, passenger comfort, and economy in fuel usage.

18. The system of claim 13, wherein the predetermined level of separation is selected from one of a required level of separation, a safe level of separation, and an imposed level of separation.

19. The system of claim 13, wherein in being configured to generate the number of compensation commands, the separation management module is configured to generate the number of compensation commands using a number of parameters.

20. The system of claim 19, wherein the response is further directed to at least one of a predetermined ride quality, a predetermined range of acceleration, a predetermined response time, and a predetermined turning rate.

* * * * *